(12) United States Patent
Lee

(10) Patent No.: US 10,402,050 B2
(45) Date of Patent: Sep. 3, 2019

(54) ELECTRONIC DEVICE AND METHOD FOR DISPLAYING OBJECT IN ELECTRONIC DEVICE

(71) Applicant: Samsung Electronics Co., Ltd., Suwon-si, Gyeonggi-do (KR)

(72) Inventor: Sang-Yup Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 598 days.

(21) Appl. No.: 15/004,014

(22) Filed: Jan. 22, 2016

(65) Prior Publication Data

US 2016/0216853 A1 Jul. 28, 2016

(30) Foreign Application Priority Data

Jan. 26, 2015 (KR) .................. 10-2015-0011905

(51) Int. Cl.
*G06F 3/0482* (2013.01)
*G06F 3/0484* (2013.01)
*G06F 3/0488* (2013.01)

(52) U.S. Cl.
CPC .......... *G06F 3/0482* (2013.01); *G06F 3/0488* (2013.01); *G06F 3/04842* (2013.01); *G06F 3/04883* (2013.01)

(58) Field of Classification Search
CPC .................................................. G06F 3/0482
See application file for complete search history.

(56) References Cited

U.S. PATENT DOCUMENTS

| 7,079,452 | B2* | 7/2006 | Harrison | G04B 25/00 368/10 |
| 9,244,594 | B2* | 1/2016 | Jiang | G06F 3/0484 |
| 9,547,433 | B1* | 1/2017 | Feldstein | G06F 3/0488 |
| 9,654,426 | B2* | 5/2017 | Underwood, IV | H04L 51/38 |
| 9,729,695 | B2* | 8/2017 | Seo | G06F 3/0482 |
| 9,857,170 | B2* | 1/2018 | Abovitz | G06F 16/7837 |
| 2008/0186808 | A1* | 8/2008 | Lee | G04G 5/04 368/10 |
| 2010/0056220 | A1* | 3/2010 | Oh | G06F 1/1616 455/566 |
| 2011/0041102 | A1* | 2/2011 | Kim | G06F 3/04883 715/863 |
| 2011/0050594 | A1* | 3/2011 | Kim | G06F 3/04847 345/173 |

(Continued)

FOREIGN PATENT DOCUMENTS

| EP | 2 669 786 A2 | 12/2013 |
| EP | 2 784 656 A1 | 10/2014 |

(Continued)

*Primary Examiner* — William L Bashore
*Assistant Examiner* — Nathan K Shrewsbury
(74) *Attorney, Agent, or Firm* — Jefferson IP Law, LLP

(57) ABSTRACT

An electronic device is provided. The electronic device includes a display and a processor configured to control to display of the display one or more first objects related to a selected item if the item is selected by a first gesture from among one or more items displayed on the display, and control to display on the display one or more second objects for performing a function of a selected first object if the first object is selected by a second gesture continuing from the first gesture from among the one or more first objects.

18 Claims, 18 Drawing Sheets

(56) References Cited

U.S. PATENT DOCUMENTS

| | | | |
|---|---|---|---|
| 2012/0098768 A1* | 4/2012 | Bendewald | B60K 35/00 345/173 |
| 2013/0147793 A1* | 6/2013 | Jeon | G06F 3/011 345/419 |
| 2013/0326421 A1* | 12/2013 | Jo | G06F 3/0482 715/841 |
| 2013/0346923 A1* | 12/2013 | Ku | G06F 3/04842 715/835 |
| 2014/0157182 A1 | 6/2014 | Kim | |
| 2014/0219066 A1* | 8/2014 | Sadilek | G06F 3/04886 368/82 |
| 2015/0135132 A1* | 5/2015 | Josephson | G06F 3/0482 715/784 |
| 2015/0138101 A1* | 5/2015 | Park | G06F 3/0412 345/173 |
| 2015/0169165 A1* | 6/2015 | Bacus | G06F 3/04883 715/863 |
| 2015/0193140 A1* | 7/2015 | Zhang | G06F 3/04883 715/863 |
| 2015/0253870 A1* | 9/2015 | Ikeda | G06F 3/0233 345/158 |
| 2015/0339044 A1* | 11/2015 | Matsuda | G06F 3/0488 715/702 |
| 2015/0339055 A1* | 11/2015 | Cho | G06F 3/04817 345/173 |

FOREIGN PATENT DOCUMENTS

| | | |
|---|---|---|
| KR | 2011-0099965 A | 9/2011 |
| KR | 2013-0117122 A | 10/2013 |
| KR | 10-1328202 B1 | 11/2013 |

\* cited by examiner

ELECTRONIC DEVICE AND METHOD FOR DISPLAYING OBJECT IN ELECTRONIC DEVICE

CROSS-REFERENCE TO RELATED APPLICATION(S)

This application claims the benefit under 35 U.S.C. § 119(a) of a Korean patent application filed on Jan. 26, 2015 in the Korean Intellectual Property Office and assigned Serial number 10-2015-0011905, the entire disclosure of which is hereby incorporated by reference.

TECHNICAL FIELD

The present disclosure relates to an electronic device and a method for displaying an object in the electronic device.

BACKGROUND

Applications such as an e-mail application, a message application, and a social networking service (SNS) application provide transmitted and received information to users, and also offer various menus allowing the users to use functions such as deletion or movement of the information.

For the menus offered in the application such as the e-mail application, the message application, and the SNS application, menus desired by the users except for simple menus such as 'save' and 'delete' are difficult to find or are found after several stages, making it difficult for the users to intuitively find the desired menus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, various aspects of the present disclosure are to provide an electronic device and a method for displaying an object in the electronic device, in which users may conveniently and intuitively use a variety of functions.

Another aspect of the present disclosure is to provide an electronic device including a display and a processor configured to control to display on the display one or more first objects related to a selected item if the item is selected by a first gesture from among one or more items displayed on the display, and control to display on the display one or more second objects for performing a function of a selected first object if the first object is selected by a second gesture continuing from the first gesture from among the one or more first objects.

In accordance with various embodiments of the present disclosure, a method for displaying an object in an electronic device is provided. The method includes displaying one or more first objects related to a selected item if the item is selected by a first gesture from among one or more items displayed on a display and displaying one or more second objects for performing a function of a selected first object if the first object is selected by a second gesture continuing from the first gesture from among the one or more first objects.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
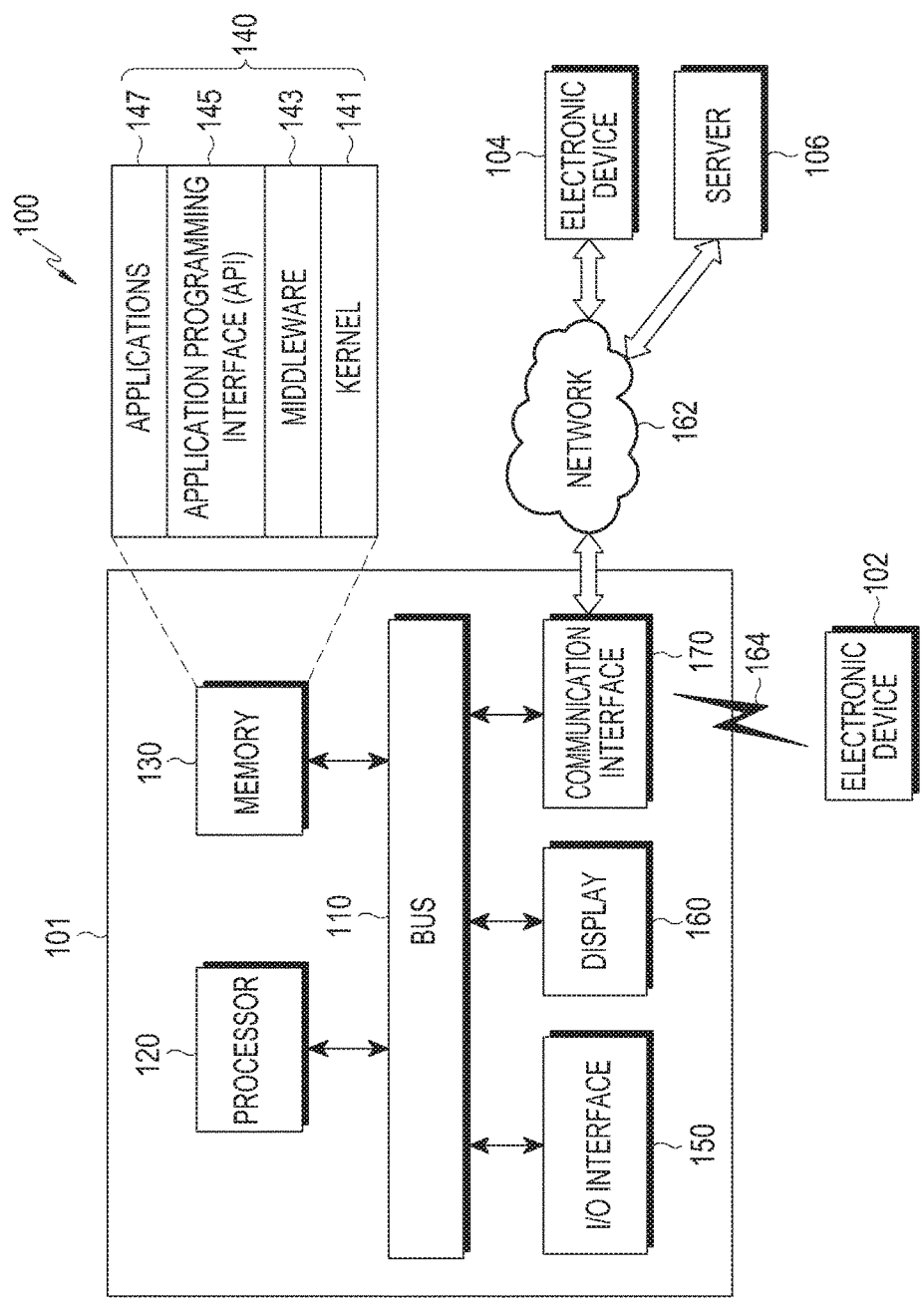
FIG. 1 illustrates a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments of the present disclosure may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor (AP)) that can perform a corresponding operation by executing at least one software program stored at an exclusive processor (such as an embedded processor) for performing a corresponding operation or at a memory device.

Terms defined in the present disclosure are used for only describing a specific embodiment of the present disclosure and may not have an intention to limit the scope of other various embodiments of the present disclosure. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined. In some case, terms defined in the present disclosure cannot be analyzed to exclude the present embodiments of the present disclosure.

An electronic device according to various embodiments of the present disclosure may be a device including a communication function. For example, the electronic device may include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an Moving Picture Experts Group phase 1 or phase 2 (MPEG-1 or MPEG-2) audio layer 3 (MP3) player, mobile medical equipment, a camera, and a wearable device (e.g., smart glasses, a head-mounted device (HMD), an electronic cloth, an electronic bracelet, an electronic necklace, an accessory, an electronic tattoo, a smart mirror, or a smart watch).

According to various embodiments of the present disclosure, the electronic device may be a smart home appliance. The home appliance may include, for example, at least one of a television (TV), a digital versatile disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

According to another embodiment of the present disclosure, the electronic device may include at least one of various medical equipment (e.g., various portable medical measurement systems, such as a blood sugar measurement device, a heartbeat measurement device, a blood pressure measurement device, or a body temperature measurement device, magnetic resonance angiography (MRA), MR imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, etc.).

According to various embodiments of the present disclosure, the electronic device may include a part of a furniture or building/structure, an electronic board, an electronic signature receiving device, a projector, and various measuring instruments (e.g., a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (e.g., an artificial intelligence electronic device).

FIG. 1 illustrates a network environment according to various embodiments of the present disclosure.

Referring to FIG. 1, a description will be made of an electronic device 101 in a network environment 100 according to various embodiments of the present disclosure. The electronic device 101 may include at least one of a bus 110, a processor 120, a memory 130, an input/output (I/O) interface 150, a display 160, and a communication interface 170. According to various embodiments of the present disclosure, the electronic device 101 may omit at least one of the foregoing elements or may further include other elements.

The bus 110 may include a circuit for interconnecting the elements 110 through 170 described above and for allowing communication (e.g., a control message and/or data) between the elements 110 through 170.

The processor 120 may include one or more of a CPU, an AP, and a communication processor (CP). The processor 120 performs operations or data processing for control and/or communication of, for example, at least one other element of the electronic device 101.

The memory 130 may include a volatile and/or nonvolatile memory. The memory 130 may store, for example, commands or data associated with at least one other element of the electronic device 101. According to an embodiment of the present disclosure, the memory 130 may store software and/or a program 140. The program 140 may include, for example, a kernel 141, middleware 143, an application programming interface (API) 145, and/or an application program (or an application) 147. At least some of the kernel 141, the middleware 143, and the API 145 may be referred to as an operating system (OS).

The kernel 141 controls or manages, for example, system resources (e.g., the bus 110, the processor 120, or the memory 130) used to execute an operation or a function implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In regard to task requests received from the application program 147, the middleware 143 may perform control (e.g., scheduling or load balancing) with respect to the task requests, for example, by giving priorities for using a system resource (e.g., the bus 110, the processor 120, or the memory 130) of the electronic device 101 to at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering a command or data input from a user or another external device to other element(s) of the electronic device 101. The I/O interface 150 may also output a command or data received from other element(s) of the electronic device 101 to a user or another external device.

The display 160 may include, for example, a liquid crystal display (LCD), a light emitting diode (LED) display, an organic LED (OLED) display, a microelectromechanical system (MEMS) display, or an electronic paper display. The display 160 may display various contents (e.g., a text, an image, video, an icon, or a symbol) to users. The display 160 may include a touch screen, and receives a touch, a gesture, proximity, or a hovering input, for example, by using an electronic pen or a part of a body of a user.

The communication interface 170 sets up communication, for example, between the electronic device 101 and an external device (e.g., a first electronic device 102, a second electronic device 104, or a server 106). For example, the communication interface 170 is connected to a network 162 through wireless or wired communication to communicate with the external device (e.g., the second electronic device 104 or the server 106).

The wireless communication may use, as a cellular communication protocol, for example, at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)). The wired communication may include, for example, at least one of a universal serial bus (USB), a high definition multimedia interface (HDMI), a recommended standard (RS)-2032, and a plain old telephone service (POTS). The network 162 may include a telecommunications network, for example, at least one of a computer network (e.g., a local area network (LAN) or a wide area network (WAN)), Internet, and a telephone network.

Each of the first electronic device 102 and the second electronic device 104 may be a device of the same type as or a different type than the electronic device 101. According to an embodiment of the present disclosure, the server 106 may include a group of one or more servers. According to various embodiments of the present disclosure, all or some of operations performed in the electronic device 101 may be performed in another electronic device or a plurality of electronic devices (e.g., the electronic devices 102 and 104 or the server 106). According to an embodiment of the present disclosure, when the electronic device 101 has to perform a function or a service automatically or at the request, the electronic device 101 may request another device (e.g., the electronic devices 102 and 104 or the server 106) to perform at least some functions associated with the function or the service instead of or in addition to executing the function or the service. The other electronic device (e.g., the electronic devices 102 and 104 or the server 106) may perform the requested function or an additional function and delivers the result to the electronic device 101. The electronic device 101 provides the received result or provides the requested function or service by processing the received result. To this end, for example, cloud computing, distributed computing, or client-server computing may be used.

Figure 2:
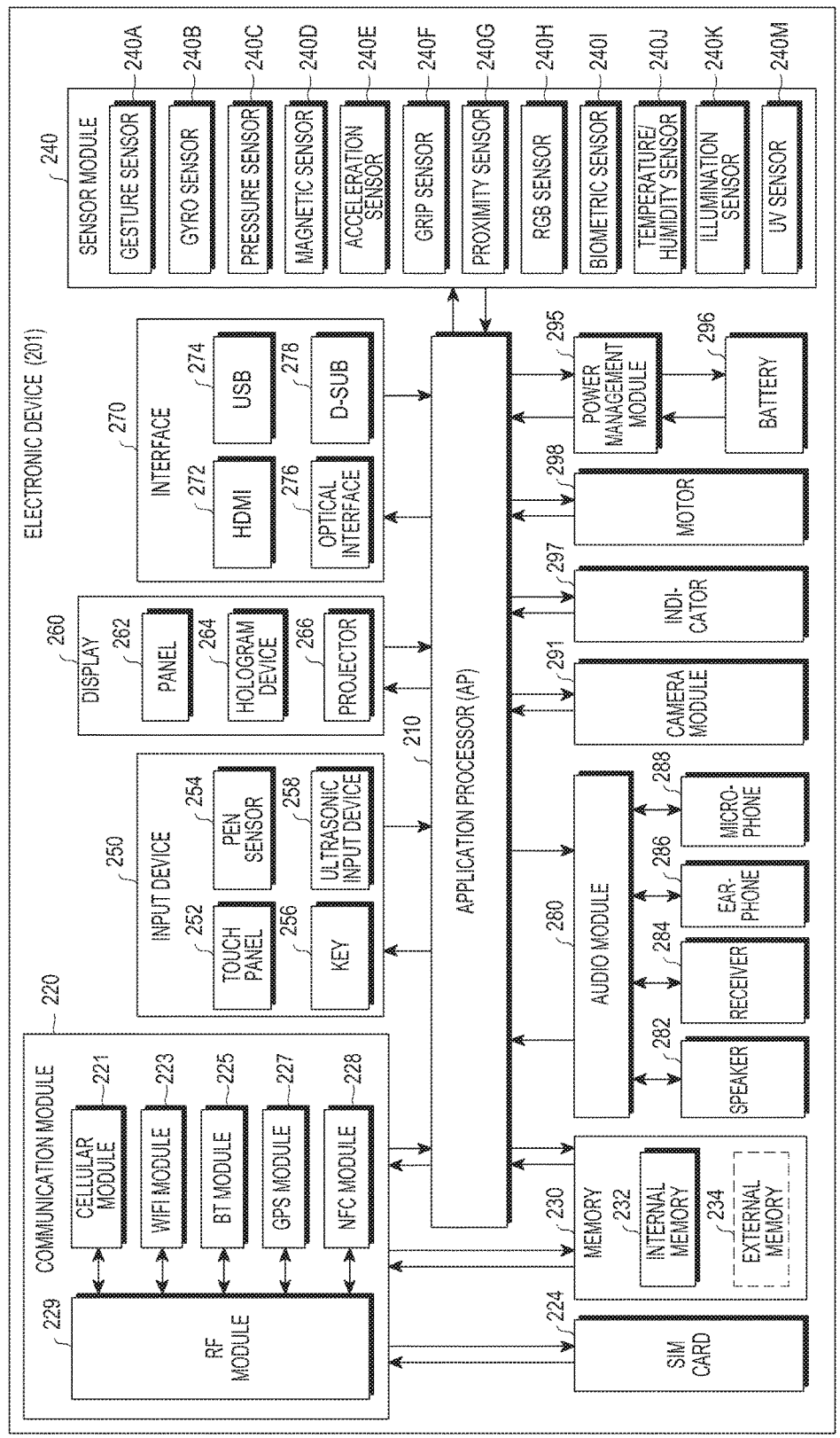
FIG. 2 is a block diagram of an electronic device according to various embodiments of the present disclosure.

FIG. 2 is a block diagram of an electronic device 201 according to various embodiments of the present disclosure.

Referring to FIG. 2, the electronic device 201 may include the entire electronic device 101 illustrated in FIG. 1 or a part of the electronic device 101 illustrated in FIG. 1. The electronic device 201 may include one or more APs 210, a communication module 220, a subscriber identification module (SIM) card 224, a memory 230, a sensor module 240, an input module 250, a display 260, an interface 270, an audio module 280, a camera module 291, a power management module 295, a battery 296, an indicator 297, and a motor 298.

The AP 210 controls multiple hardware or software components connected to the AP 210 by driving an OS or an application program, and performs processing and operations with respect to various data including multimedia data. The AP 210 may be implemented with, for example, a system on chip (SoC). According to an embodiment of the present disclosure, the AP 1810 may further include a GPU and/or an image signal processor. The AP 210 may include at least some (e.g., the cellular module 221) of the elements shown in FIG. 2. The AP 1810 loads a command or data received from at least one of other elements (e.g., a non-volatile memory) into a volatile memory and processes the command or data and stores various data in the non-volatile memory.

The communication module 220 may have a configuration that is the same as or similar to the communication interface 170 illustrated in FIG. 1. The communication module 220 may include, for example, the cellular module 221, a WiFi module 223, a Bluetooth (BT) module 225, a global positioning system (GPS) module 227, a near field communication (NFC) module 228, and a radio frequency (RF) module 229.

The cellular module 221 may provide, for example, a voice call, a video call, a text service, or an Internet service over a communication network. According to an embodiment of the present disclosure, the cellular module 221 may identify and authenticate the electronic device 201 in a communication network by using a subscriber identification module (e.g., the SIM card 224). According to an embodiment of the present disclosure, the cellular module 221 performs at least one of functions that may be provided by the AP 210. According to an embodiment of the present disclosure, the cellular module 221 may include a CP.

At least one of the WiFi module 223, the BT module 225, the GPS module 227, and the NFC module 228 may include a processor for processing data transmitted and received by a corresponding module. According to some embodiment of the present disclosure, at least some (e.g., two or more) of the cellular module 221, the WiFi module 223, the BT module 225, the GPS module 227, and the NFC module 228 may be included in one integrated chip (IC) or IC package.

The RF module 229 may transmit and receive a communication signal (e.g., an RF signal). The RF module 229 may include a transceiver, a power amplifier module (PAM), a frequency filter, a low noise amplifier (LNA), or an antenna. According to another embodiment of the present disclosure, at least one of the cellular module 221, the WiFi module 223, the BT module 225, the GPS module 227, and the NFC module 228 may transmit and receive an RF signal through a separate RF module.

The SIM card 224 may include a card including an SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may include an internal memory 232 or an external memory 234. The internal memory 232 may include at least one of a volatile memory (e.g., dynamic random access memory (DRAM), static RAM (SRAM), synchronous DRAM (SDRAM), and a non-volatile memory (e.g., one time programmable read only memory (OTPROM), PROM, erasable and programmable ROM (EPROM), electrically EPROM (EEPROM), mask ROM, flash ROM, NAND flash memory, or NOR flash memory), and a solid state drive (SSD).

The external memory 234 may further include flash drive, for example, compact flash (CF), secure digital (SD), micro-SD, mini-SD, extreme Digital (xD), a multimedia card (MMC), or a memory stick. The external memory 234 may be functionally and/or physically connected with the electronic device 1801 through various interfaces.

The sensor module 240 measures physical quantity or senses an operation state of the electronic device 201 to convert the measured or sensed information into an electric signal. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 1840 may include an e-nose sensor (not shown), an electromyography (EMG) sensor (not shown), an electroencephalogram (EEG) sensor (not shown), an electrocardiogram (ECG) sensor (not shown), or a fingerprint sensor. The sensor module 240 may further include a control circuit for controlling at least one sensor included therein. In an embodiment of the present disclosure, the electronic device 201 may further include a processor configured to control the sensor module 240 as part of or separately from the AP 210, to control the sensor module 240 during a sleep state of the AP 210.

The input module 250 may include a touch panel 252, a (digital) pen sensor 254, a key 256, or an ultrasonic input device 258. The touch panel 252 may use at least one of a capacitive type, a resistive type, an infrared (IR) type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated in an input means for generating the ultrasonic waves through a microphone (e.g., the microphone 288) and checks data corresponding to the sensed ultrasonic waves in the electronic device 201.

The display 260 (e.g., the display 160) may include a panel 262, a hologram device 264, or a projector 266. The panel 262 may have a configuration that is the same as or similar to that of the display 160 of FIG. 1. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto an external screen through projection of light. The screen may be positioned inside or outside the electronic device 201. According to an embodiment of the present disclosure, the display 260 may further include a control circuit for controlling the panel 262, the hologram device 264, or the projector 266.

The interface 270 may include a high-definition multimedia interface (HDMI) 272, USB 274, an optical interface 276, or a D-subminiature 278. The interface 270 may be included in the communication interface 170 illustrated in FIG. 1. Additionally or alternatively, the interface 270 may include a mobile high-definition link (MHL) interface, an SD/MMC interface, or an infrared data association (IrDA) interface.

The audio module 280 bi-directionally converts sound and an electric signal. At least one element of the audio module 280 may be included in the I/O interface 150 illustrated in FIG. 1. The audio module 280 processes sound information input or output through the speaker 282, the receiver 284, the earphone 286, or the microphone 288.

The camera module 291 is a device capable of capturing a still image or a moving image, and according to an embodiment of the present disclosure, may include one or more image sensors (e.g., a front sensor or a rear sensor), a lens, an image signal processor (ISP), or a flash (e.g., an LED or a xenon lamp).

The power management module 295 manages power of the electronic device 201. According to an embodiment of the present disclosure, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 296 or the voltage, current, or temperature of the battery 1896 during charging. The battery 296 may include a rechargeable battery and/or a solar battery.

The indicator 297 displays a particular state, for example, a booting state, a message state, or a charging state, of the electronic device 1801 or a part thereof (e.g., the AP 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as digital multimedia broadcasting (DMB), digital video broadcasting (DVB), or MediaFlo™.

Each of the foregoing elements described herein may include one or more components, and a name of the part may vary with a type of the electronic device 201. The electronic device according to the present disclosure may include at least one of the foregoing elements, and some of the elements may be omitted therefrom or other elements may be further included therein. As some of the elements of the electronic device according to the present disclosure are coupled into one entity, the same function as those of the elements that have not been coupled may be performed.

Figure 3:
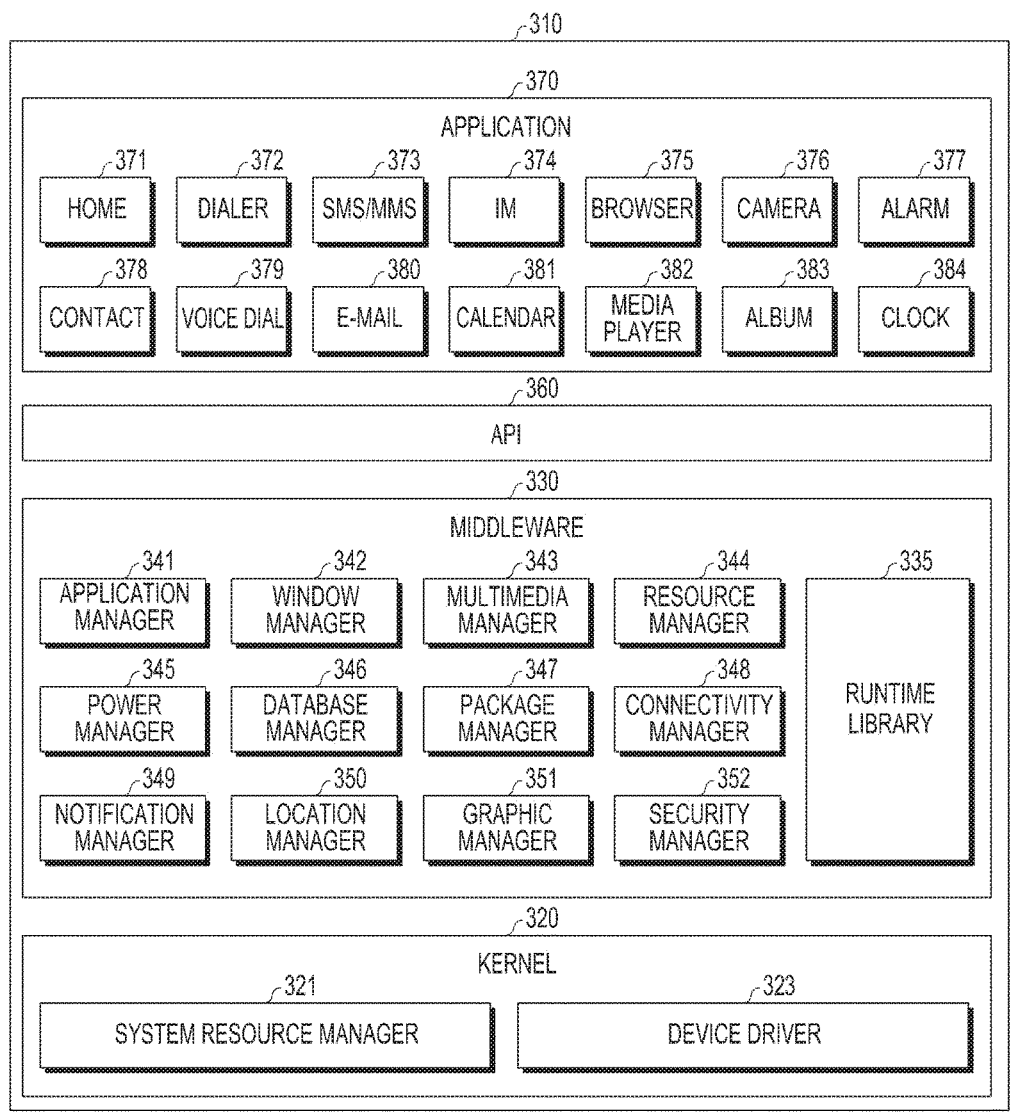
FIG. 3 is a block diagram of a program module according to various embodiments of the present disclosure.

FIG. 3 is a block diagram of a programming module 310 according to various embodiments of the present disclosure. According to an embodiment of the present disclosure, the programming module 310 (e.g., the program 140) may include an OS for controlling resources associated with an electronic device (e.g., the electronic device 101) and/or various applications executed on the OS. The OS may include Android, iOS, Windows, Symbian, Tizen, or Bada.

Referring to FIG. 3, the programming module 310 may include a kernel 320, a middleware 330, an API 360, and/or an application 370. At least a part of the programming module 310 may be preloaded on an electronic device or may be downloaded from a server (e.g., the server 106).

The kernel 320 (e.g., the kernel 141 of FIG. 1) may include a system resource manager 321 and/or a device driver 323. The system resource manager 321 may perform control, allocation, or retrieval of system resources. According to an embodiment of the present disclosure, the system resource manager 321 may include a process management unit, a memory management unit, or a file system. The device driver 323 may include, for example, a display driver, a camera driver, a BT driver, a shared memory driver, a USB driver, a keypad driver, a WiFi driver, an audio driver, or an inter-process communication (IPC) driver.

The middleware 330 may include functions that the application 370 commonly uses or provide various functions to the application 370 through the API 360 to allow the application 370 to efficiently use a limited system resource in an electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an I/O, memory management, or calculation operation.

The application manager 341 manages a life cycle of at least one application among the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or BT connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface (UI) related thereto. The security manager 352 provides a general security function necessary for system security or user authentication. According to an embodiment of the present disclosure, when an electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. In the case of Android or iOS, for example, one API set may be provided by each platform, and in the case of Tizen, two or more API sets may be provided.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount or a blood sugar), or an environment information providing application (e.g., an application for providing air pressure, humidity, or temperature information).

According to an embodiment of the present disclosure, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user. The device management application may manage (e.g., install, remove, or update) at least one function (e.g., turn on/turn off of an external electronic device 104 itself (or a part thereof) or control of brightness (or resolution) of a display, a service provided by an application operating in an external electronic device (e.g., the electronic device) or provided by the external electronic device (e.g., a call service or a message service).

According to an embodiment of the present disclosure, the application 370 may include an application (e.g., a health care application) designated according to an attribute of the external electronic device (e.g., a type of the electronic device being mobile medical equipment as the attribute of the electronic device). According to an embodiment of the present disclosure, the application 370 may include an application received from the external electronic device (e.g., the server 106 or the electronic device 102 or 104). According to an embodiment of the present disclosure, the application 370 may include a preloaded application or a third party application that may be downloaded from the server. Names of elements of the programming module 310 according to the illustrated embodiment may vary depending on a type of an OS.

According to various embodiments of the present disclosure, at least a part of the programming module 310 may be implemented by software, firmware, hardware, or a combination of at least two of them. The at least a part of the programming module 310 may be implemented (e.g., executed) by a processor (e.g., the AP 210). The at least a part of the programming module 310 may include a module, a program, a routine, sets of instructions, or a process for performing one or more functions.

A term "module" used herein may mean, for example, a unit including one of or a combination of two or more of hardware, software, and firmware. The "module" may be interchangeably used with a unit, logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of a device (for example, modules or functions thereof) or a method (for example, operations) according to various embodiments of the present disclosure may be implemented with a command stored in a non-transitory computer-readable storage medium in the form of a program module. When the command is executed by a processor (for example, the processor 120), the one or more processors may perform a function corresponding to the command. The non-transitory computer-readable storage medium may be, for example, the memory 130.

The non-transitory computer readable recording medium includes magnetic media such as hard disk, floppy disk, or magnetic tape, optical media such as compact disc ROM (CD-ROM) or DVD, magneto-optical media such as floptical disk, and a hardware device such as ROM, RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

The various embodiments of the present disclosure disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

Figure 4:
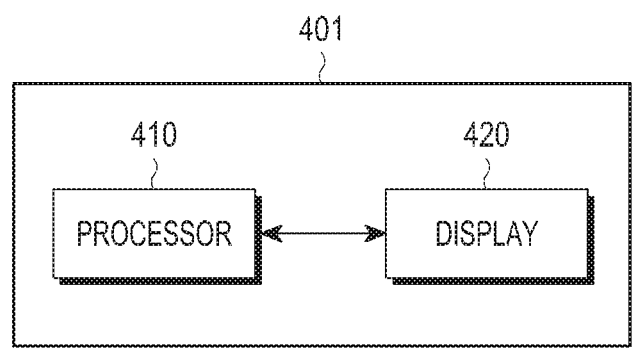
FIG. 4 is a block diagram of an electronic device for displaying an object according to various embodiments of the present disclosure.

FIG. 4 is a block diagram of an electronic device 401 for displaying an object according to various embodiments of the present disclosure. The electronic device 401 may be, for example, the electronic device 101 shown in FIG. 1. Referring to FIG. 4, the electronic device 401 may include a processor 410 and a display 420.

Referring to FIG. 4, the processor 410 may be the processor 120 shown in FIG. 1. The processor 410 may include a combination of one or more of hardware, software, and firmware.

According to various embodiments of the present disclosure, once one of one or more items is selected, the processor 410 displays one or more first objects capable of controlling the selected item around a position at which the item is selected. Once a first object is selected from among the one or more first objects, the processor 410 displays one or more second objects for performing a function of the selected first object around a position at which the first object is selected.

According to an embodiment of the present disclosure, at least two of the item, the first object, and the second object may be selected by a continuous gesture. The continuous gesture may include at least one of a first gesture corresponding to a touch input and a second gesture corresponding to a drag input.

According to an embodiment of the present disclosure, the processor 410 displays the one or more first objects while the first gesture (e.g., a touch input) with respect to the item is maintained, and does not display the one or more first objects if the first gesture with respect to the item is not sensed.

According to an embodiment of the present disclosure, the processor 410 displays the one or more first objects if the first gesture (e.g., a touch input) with respect to the item is sensed for a predetermined time and then released, and does not display the one or more first objects if the first gesture with respect to the item is sensed for a predetermined time again and then released again.

According to an embodiment of the present disclosure, the processor 410 displays the one or more first objects around a position at which the item is selected, as a UI in various forms (e.g., a circular form, a bar form, a semi-circular form, or the like) in which the one or more first objects are selectable while having at least one of a distance, a direction, and a speed. The processor 410 may display the one or more first objects in such a manner that the one or more first objects are spaced apart from each other. A form for displaying the one or more first objects may be selected by a user. The form for displaying the one or more first objects may change according to a position or type of the selected item. According to an embodiment of the present disclosure, the processor 410 detects a type of the one or more first objects based on a type of the selected item, and displays the detected type of the one or more first objects. The processor 410 changes the number of one or more first objects based on the form for displaying the one or more first objects. For example, if ten first objects are detected based on the type of the selected item and the one or more first objects are displayed as a UI in a circular form capable of displaying eight objects, the eight first objects are detected among the ten first objects based on the frequency of use and are displayed as the UI in the circular form.

According to an embodiment of the present disclosure, when displaying the one or more first objects, the processor 410 changes positions of the respective one or more first objects according to the frequency of use and displays the one or more first objects. For example, if the one or more first objects are displayed as a UI in a circular form, the one or more first objects may be displayed sequentially in order from highest to lowest frequency of use from the right center to the left.

According to an embodiment of the present disclosure, the processor 410 changes the positions of the one or more first objects to positions selected by the user.

Figure 5A:
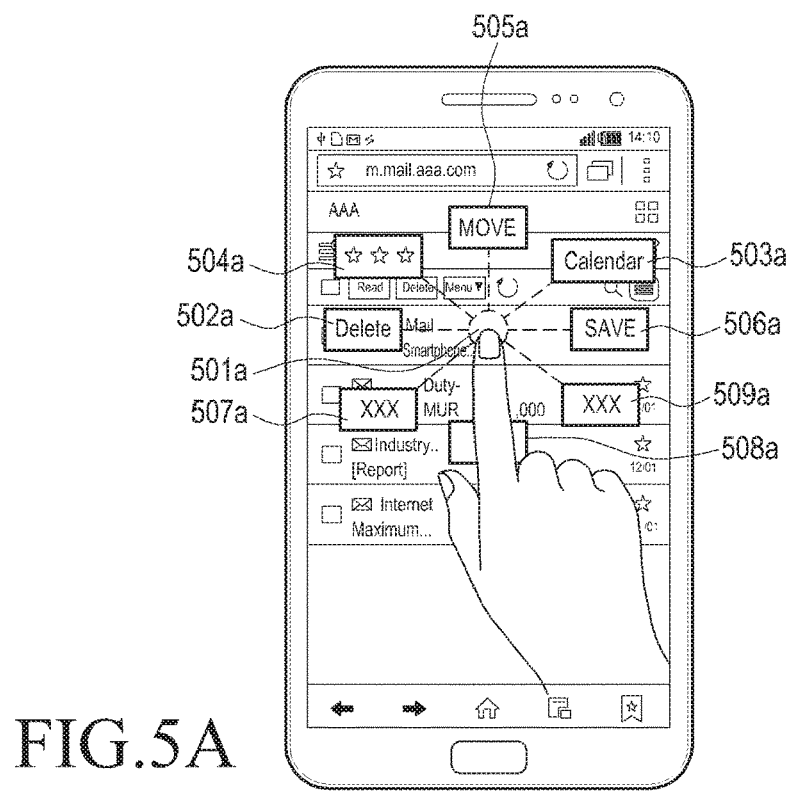
FIGS. 5A and 5B are diagrams for describing object display related to a mail item in an electronic device according to various embodiments of the present disclosure.
Figure 5B:
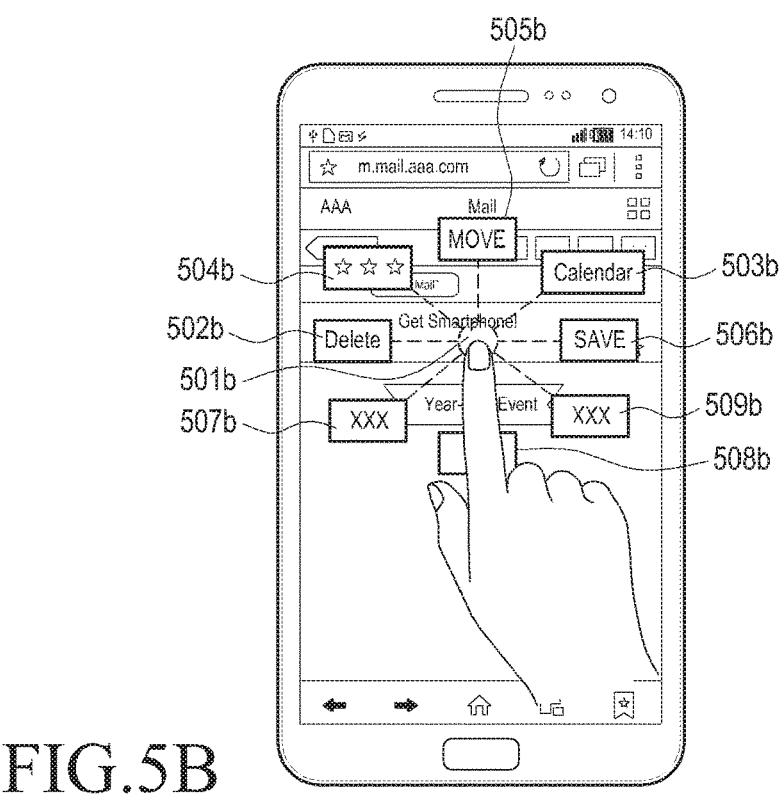

According to an embodiment of the present disclosure, for example, if a first gesture (e.g., a touch input) is sensed on a mail item 501a (e.g., a title of a mail) in a mail list as shown in FIG. 5A or the first gesture (e.g., the touch input) is sensed on a mail item 501b (e.g., a title of a mail) during displaying of mail contents as shown in FIG. 5B, the processor 410 displays one or more first objects 502a through 508a or 502b through 508b as a UI in a circular form around a position at which the mail item 501a or 501b is selected.

FIGS. 5A and 5B are diagrams for describing object display related to a mail item in an electronic device according to various embodiments of the present disclosure.

Referring to FIGS. 5A and 5B, the one or more first objects 502a through 508a or 502b through 508b indicating functions for controlling the mail item 501a or 502b may include at least one of a deletion (Delete) object 502a or 502b for deleting the mail item 501a or 501b, a calendar (Calendar) object 503a or 503b for storing the mail item 501a or 501b in a position of a particular date, an importance setting object 504a or 504b for setting importance of the mail item 501a or 501b, a movement (Move) object 505a or 505b for moving the mail item 501a or 501b to a mailbox, a save (Save) object 506a or 506b for saving the mail item 501a or 501b, or user-set objects 507a through 509a or 507b through 509b for displaying objects selected by a user.

According to an embodiment of the present disclosure, if during generation of a first gesture (e.g., a touch input) with respect to an item, a first object is selected from among the one or more first objects by a second gesture (e.g., a drag input) continuing from the first gesture, the processor 410 displays one or more second objects for performing a function of the selected first object around a position at which the first object is selected. According to an embodiment of the present disclosure, if the first object is selected from among the one or more first objects, the processor 410 displays the one or more second objects without displaying the other first objects remaining after the selected first object from among the one or more first objects.

According to an embodiment of the present disclosure, the processor 410 displays the one or more second objects as a UI in various forms (e.g., a circular form, a bar form, and a semi-circular form) in which the one or more second objects are selectable while having at least one of a distance and a direction, around a position at which the first object is selected. The form for displaying the one or more second objects may be selected by the user. The form for displaying the one or more second objects may be changed according to the position or type of the selected item.

According to an embodiment of the present disclosure, if during displaying of the first object and the one or more second objects, the second object is selected by a third gesture (e.g., a drag input) continuing from the second gesture after selection of the first object, then the processor 410 performs a function of the first object.

According to an embodiment of the present disclosure, if during displaying of the first object and the one or more second objects, a predetermined position ahead of a position corresponding to the second object is selected by the third gesture (e.g., a drag input) continuing from the second gesture after selection of the first object, the processor 410 sets a time corresponding to a moving distance from the first object to the predetermined position as a time for performing the function of the first object.

According to an embodiment of the present disclosure, the processor 410 displays a time corresponding to a moving distance on a real time basis during movement toward the displayed second object by the third gesture (e.g., a drag input) continuing from the second gesture after selection of the first object.

FIGS. 6A to 6D are diagrams for describing a deletion function related to a mail item in an electronic device according to various embodiments of the present disclosure.

Figure 6A:
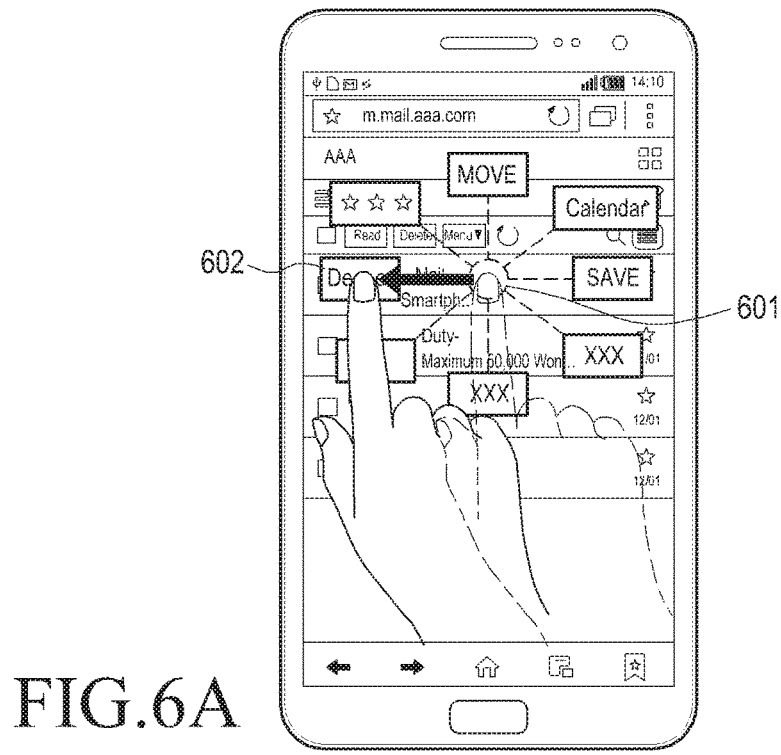
FIGS. 6A to 6D are diagrams for describing a deletion function related to a mail item in an electronic device according to various embodiments of the present disclosure.
Figure 6B:
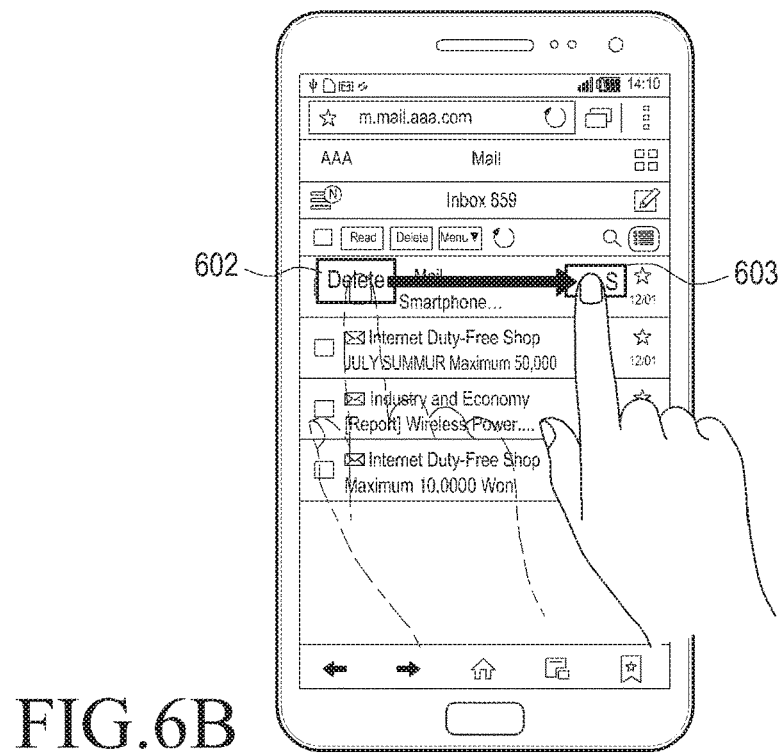

According to an embodiment of the present disclosure, if during displaying of one or more first objects based on selection of a mail item 601 by the first gesture, a Delete object 602 is selected by the second gesture (e.g., a drag input) toward the Delete object 602 continuing from the first gesture as shown in FIG. 6A, then the processor 410 displays the Delete object 602 and a deletion complete (YES) object 603 for performing a deletion function as shown in FIG. 6B.

Referring to FIG. 6B, if the YES object 603 displayed at a predetermined distance from the Delete object 602 is selected by the third gesture (e.g., a drag input) continuing from the second gesture after selection of the Delete object 602 by the second gesture, then the processor 410 immediately deletes the mail item 601.

Figure 6C:
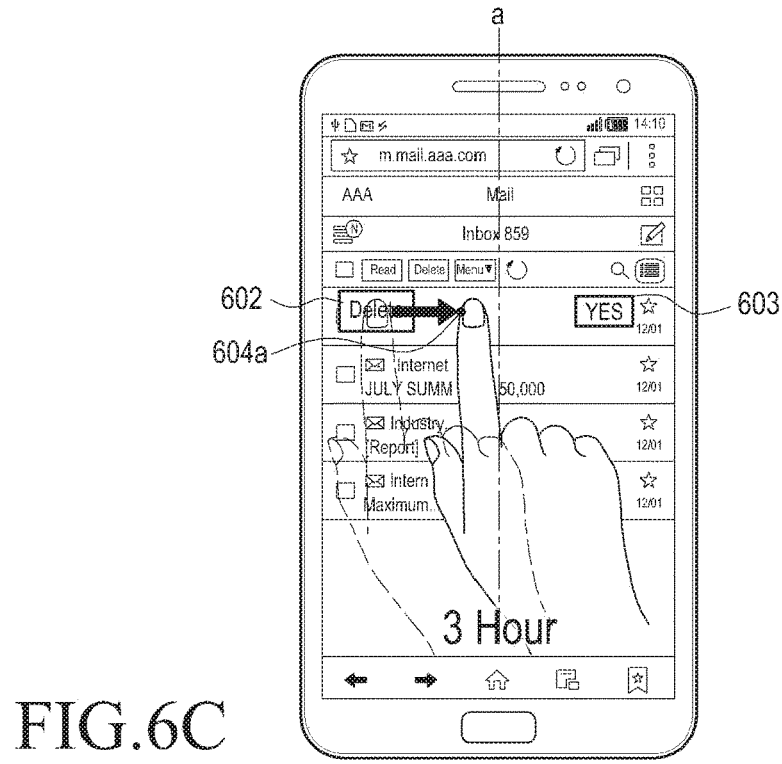
Figure 6D:
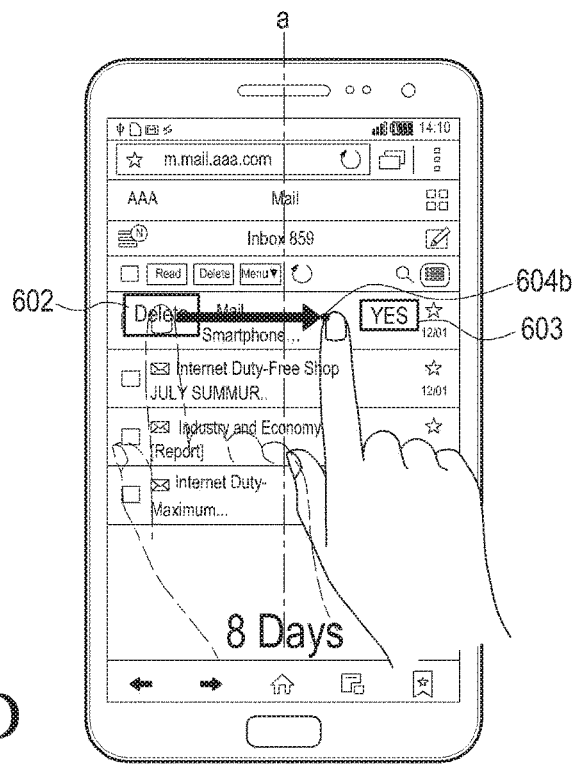

Referring to FIGS. 6C and 6D, once movement toward the displayed YES object 603 starts by the third gesture (e.g., a drag input) continuing from the second gesture after selection of the Delete object 602 by the second gesture, the processor 410 sets a timer to a deletion time, detects a deletion time corresponding to a moving distance generated by the third gesture (e.g., a drag input), and displays the deletion time on a real time basis. The processor 410 may set 1 hour to 24 hours as a time value from the Delete object 602 to a middle position of the distance between the Delete object 602 to the YES object 603 and set 1 days to 31 days as a time value from the middle position to the YES object 603.

In FIG. 6C, if the third gesture (e.g., a drag input) continuing from the second gesture after selection of the Delete object 602 by the second gesture moves toward the displayed YES object 603 and selects a first position 604a, the processor 410 may detect a deletion time set for the first position 604a, "3 hour", as a deletion time for the mail item 601.

In FIG. 6D, if the third gesture (e.g., a drag input) continuing from the second gesture after selection of the Delete object 602 by the second gesture moves toward the displayed YES object 603 and selects a second position 604b, the processor 410 may detect a deletion time set for the second position 604b, "8 days", as a deletion time for the mail item 601.

According to an embodiment of the present disclosure, if the first object is selected by the second gesture from among the one or more first objects, the processor 410 displays an execution screen of at least one applications associated with the first object. If the execution screen of the at least one application is selected by a third gesture (e.g., a drag input) continuing from the second gesture after selection of the first object, the processor 410 performs a function related to the at least one application with respect to the item.

FIGS. 7A to 7D are diagrams for describing a calendar function related to a mail item in an electronic device according to various embodiments of the present disclosure.

Figure 7A:
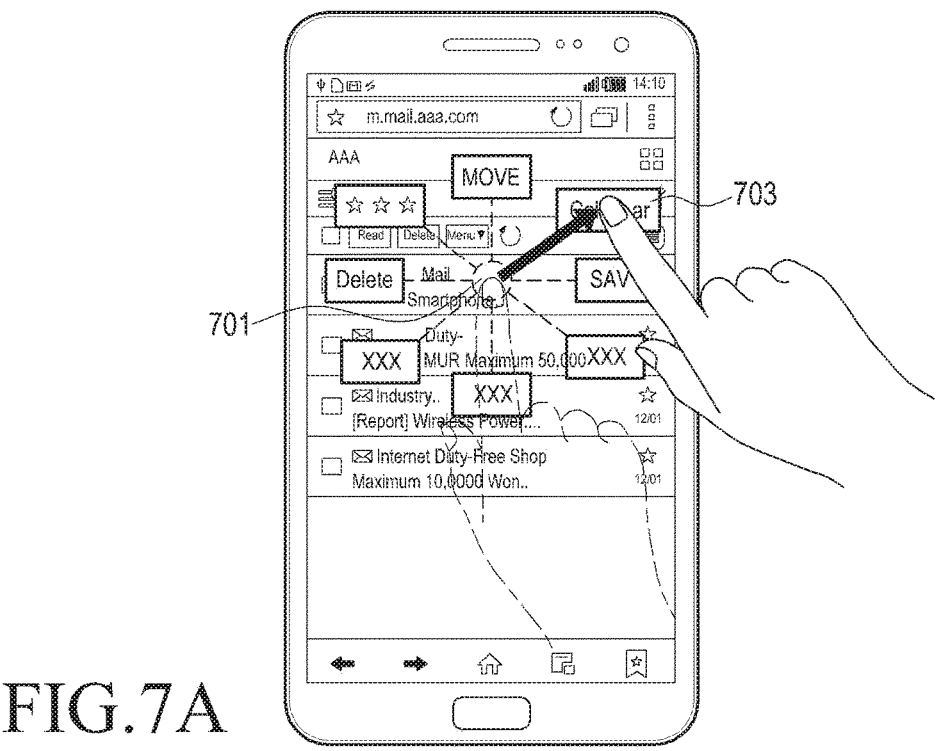
FIGS. 7A to 7D are diagrams for describing a calendar function related to a mail item in an electronic device according to various embodiments of the present disclosure.
Figure 7B:
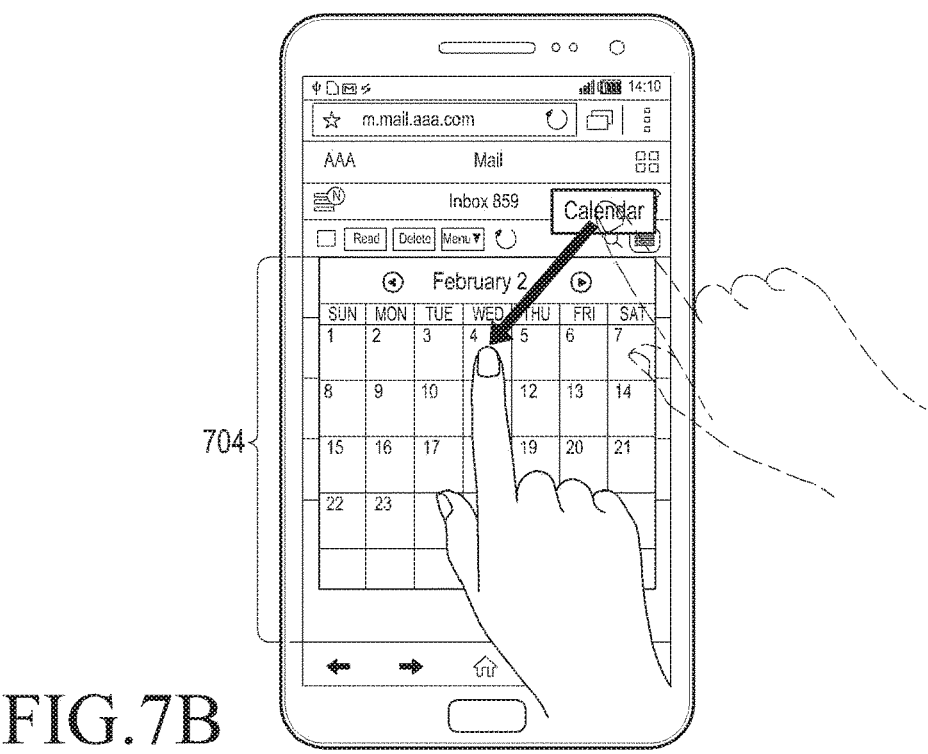

According to an embodiment of the present disclosure, if during displaying of one or more first objects based on selection of a mail item 701, a Calendar object 703 is selected by the second gesture (e.g., a drag input) toward the displayed Calendar object 703 continuing from the first gesture as shown in FIG. 7A, the processor 410 executes a calendar application and displays an execution screen 704 of the executed calendar application as shown in FIG. 7B. If a particular date is selected on the execution screen 704 of the executed calendar application by the third gesture (e.g., the drag input) continuing from the second gesture after selection of the Calendar object 703 by the second gesture, then the processor 410 stores a title of the mail item 701 in a position of the selected particular date. If the title of the mail item 701, stored in the position of the particular date of the calendar application, is selected, the processor 410 displays mail contents corresponding to the title of the mail item 701.

Figure 7C:
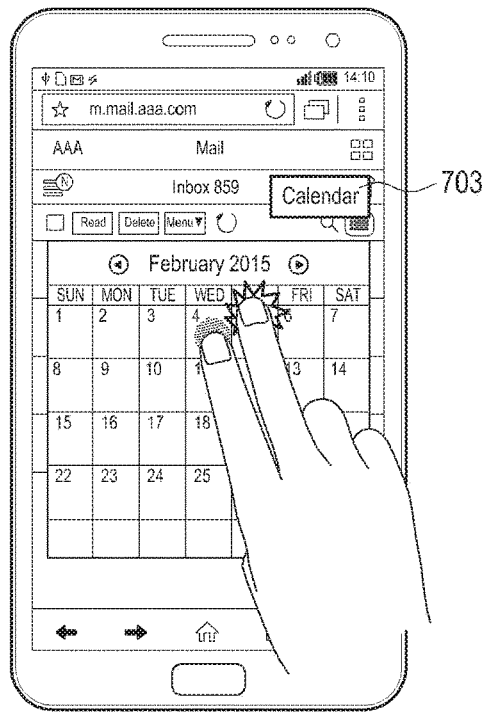
Figure 7D:
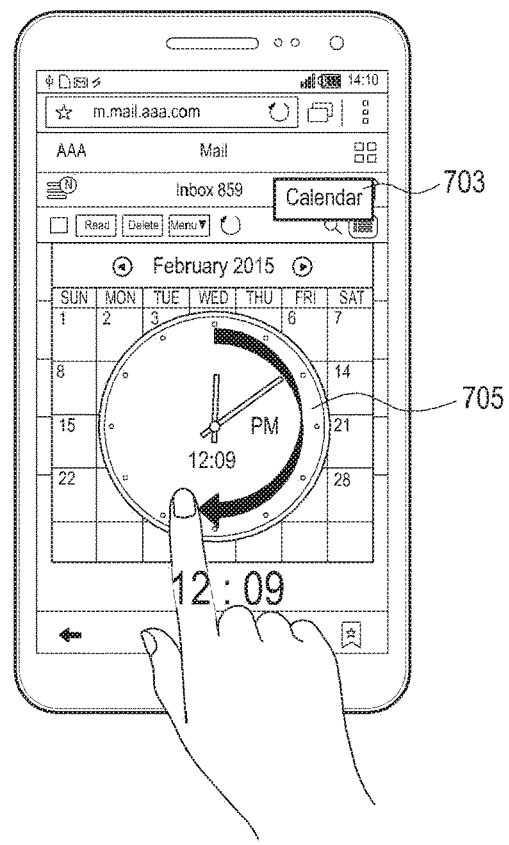

After the title of the mail item 701 is stored in the position of the particular date, if a fifth gesture (e.g., two consecutive touch inputs within a predetermined time) for setting an alarm is generated in the position of the particular date as shown in FIG. 7C, then the processor 410 displays a UI 705 for setting an alarm as shown in FIG. 7D.

If a clock is displayed as the UI 705 for setting an alarm as shown in FIG. 7D, the processor 410 may set or change an alarm time in the clock based on rotation along a circle or based on a rotation direction. For example, the processor 410 may set one-round rotation as one hour, set clockwise rotation as time increase, set counterclockwise rotation as time decrease, and set the alarm time on a hour or minute basis.

Once the alarm time is set through the alarm setting UI 705 as shown in FIG. 7D, the processor 410 sets the alarm time as an alarm time for the mail item 701 stored in position of the particular date.

According to an embodiment of the present disclosure, the processor 410 sets, as a level for the item, a level corresponding the second object selected from among the one or more second objects by the third gesture (e.g., a touch input) continuing from the second gesture during displaying of the first object and the one or more second objects.

Figure 8A:
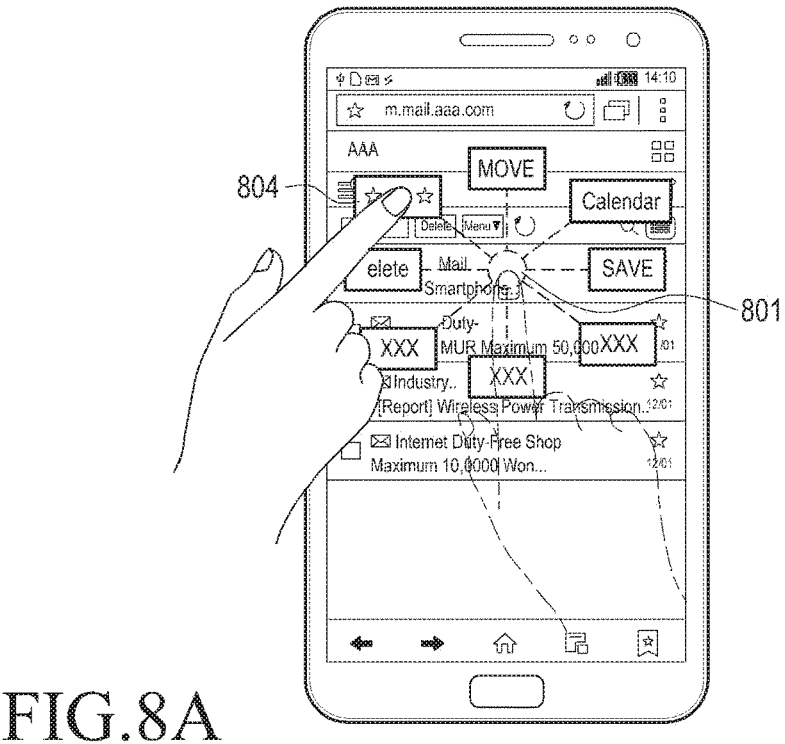
FIGS. 8A to 8C are diagrams for describing an importance setting function related to a mail item in an electronic device according to various embodiments of the present disclosure.
Figure 8B:
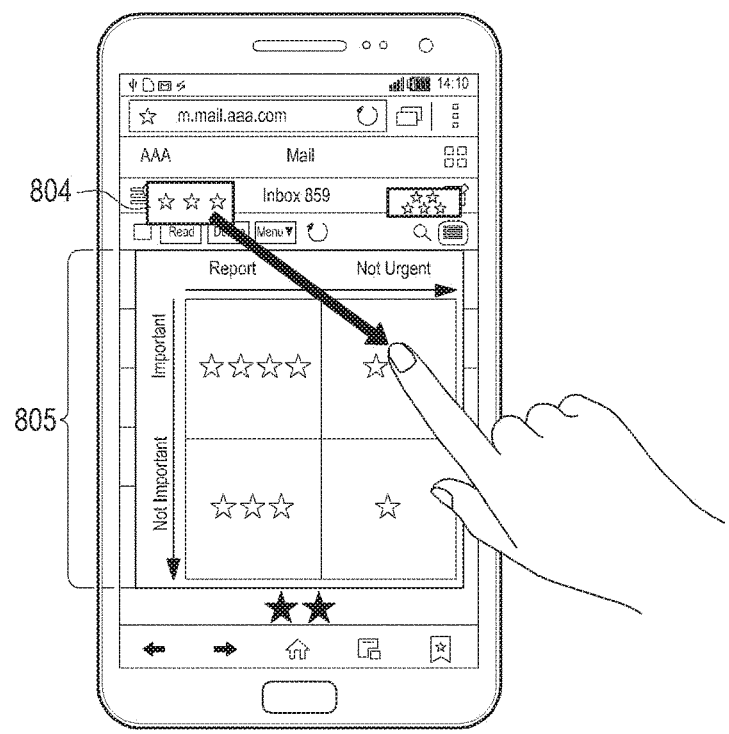
Figure 8C:
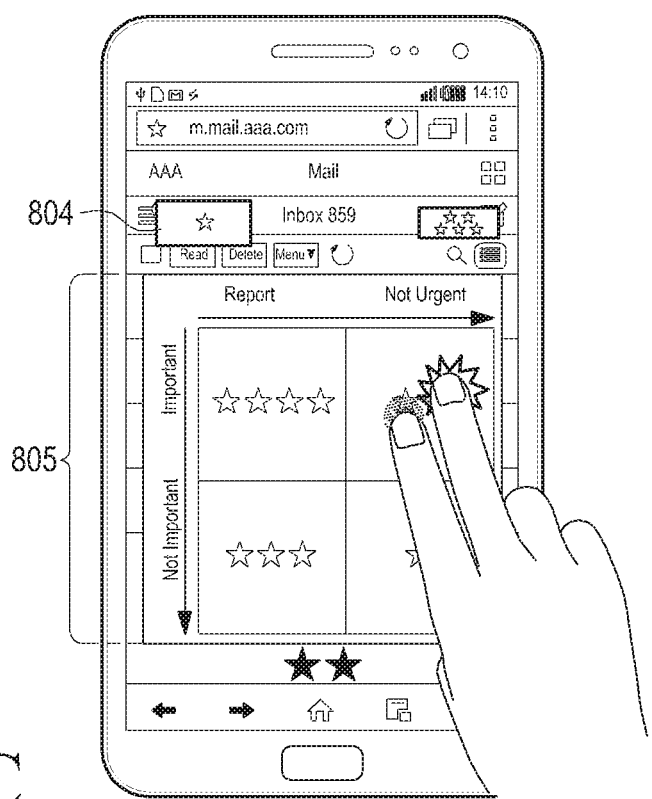

FIGS. 8A to 8C are diagrams for describing an importance setting function related to a mail item in an electronic device according to various embodiments of the present disclosure.

According to an embodiment of the present disclosure, if during displaying of one or more first objects based on selection of a mail item 801, an importance setting object (*) 804 is selected by a second gesture (e.g., a drag input) continuing from the first gesture toward the displayed importance setting object (*) 804 as shown in FIG. 8A, the processor 410 displays importance type objects 805 as shown in FIG. 8B. As shown in FIG. 8B, the importance may be classified into a first importance (**) indicating that the mail item 801 is urgent and important, a second importance (*) indicating that the mail item 801 is not urgent, but is important, a third importance (**) indicating that the mail item 801 is not important, but is urgent, and a fourth importance (*) indicating that the mail item 801 is not either important or urgent. If the importance setting object (*) 804 is selected by the second gesture and then the third importance () is selected from among the importance type objects 805 by a third gesture (e.g., a drag input) continuing from the second gesture as shown in FIG. 8B, then the processor 410 sets the selected third importance () as an importance of the mail item 801. If the importance setting object (*) 804 is selected by the second gesture, the third importance (**) is selected from among the importance type objects 805 by a third gesture (e.g., a drag input) continuing from the second gesture, and then a fifth gesture (e.g., two consecutive touch inputs within a predetermined time) is sensed for viewing details as shown in FIG. 8C, then the processor 410 displays types of items set to correspond to the third importance.

According to an embodiment of the present disclosure, for items for each of which at least one of a date and an importance are set, the processor 410 may automatically sort the items by priority based on the dates or the importance and display the items accordingly.

According to an embodiment of the present disclosure, during displaying of the first object and the one or more second objects, the processor 410 may move the item to a position corresponding to the second object selected by the third gesture (e.g., a drag input) continuing from the second gesture from among the one or more second objects.

According to an embodiment of the present disclosure, if there is at least one sub menu under the second object selected from among the one or more second objects, the processor 410 displays at least one sub object related to the second object.

Figure 9A:
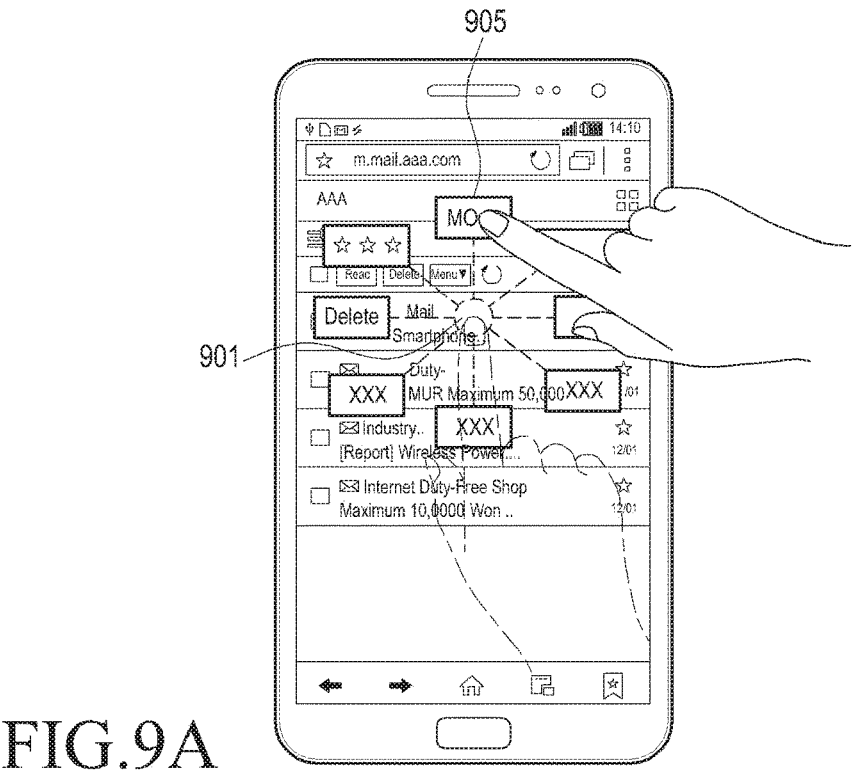
FIGS. 9A to 9C are diagrams for describing a mailbox moving function related to a mail item in an electronic device according to various embodiments of the present disclosure.
Figure 9B:
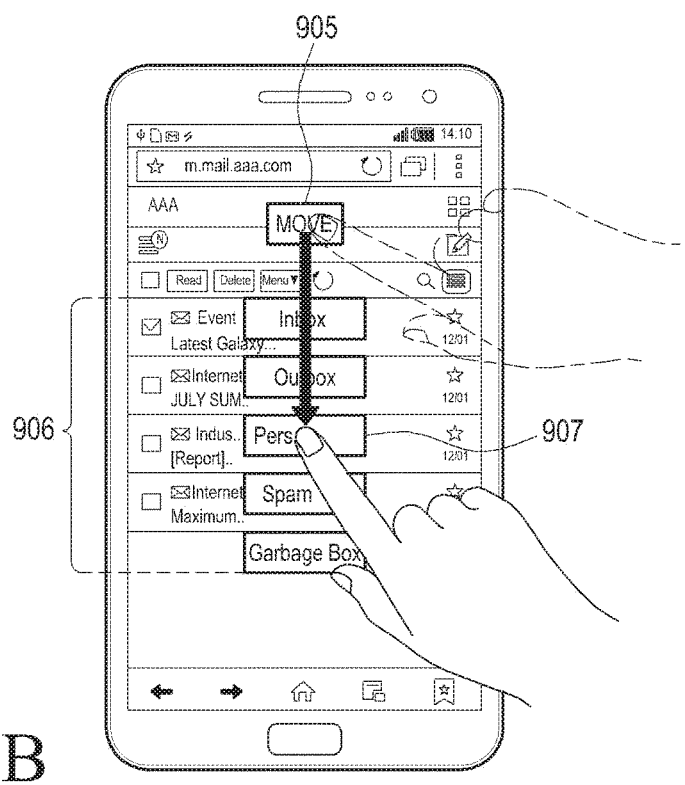
Figure 9C:
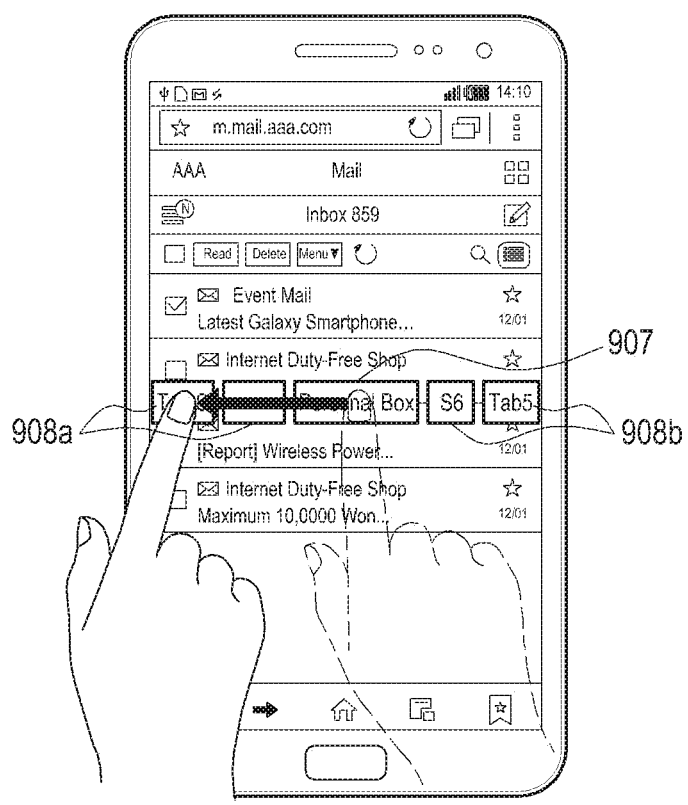

FIGS. 9A to 9C are diagrams for describing a mailbox moving function related to a mail item in an electronic device according to various embodiments of the present disclosure.

According to an embodiment of the present disclosure, if during displaying of one or more first objects based on selection of a mail item 901, a mailbox moving (MOVE) object 905 is selected by a second gesture (e.g., a drag input) continuing from the first gesture toward the displayed MOVE object 905 as shown in FIG. 9A, then the processor 410 displays mailbox type objects 906 as shown in FIG. 9B. If the MOVE object 905 is selected by the second gesture and then a personal mailbox 907 in the middle of the mailbox type object 906 is selected by a third gesture (e.g., a drag input) continuing from the second gesture as shown in FIG. 9B, then the processor 410 separately displays sub menus 908a and 908b of the personal mailbox 907 to the left and to the right with respect to the personal mailbox 907, respectively, as shown in FIG. 9C.

The display 420 may be the display 160 shown in FIG. 1. According to an embodiment of the present disclosure, the display 420 may display one or more first objects related to an item around a position where the item is selected, and one or more second objects for performing a function of a first object selected from among the one or more first objects around a position where the first object is selected.

According to various embodiments of the present disclosure, the display 420 may be functionally connected with the electronic device 401 and the processor 410 may be configured to display one or more first objects related to a selected item if the item is selected by a first gesture from among one or more items displayed on the display, and to display one or more second objects for performing a function of a selected first object if the first object is selected by a second gesture continuing from the first gesture from among the one or more first objects.

According to various embodiments of the present disclosure, the one or more first objects may be displayed to be selected while having at least one of a distance, a direction, and a speed with respect to a position of the item, and the one or more first objects may be displayed spaced apart from each other.

According to various embodiments of the present disclosure, the processor 410 may be configured to perform the function of the selected first object if the second object is selected during movement toward the displayed second object by a third gesture continuing from the second gesture after selection of the first object, and to set a time corresponding to a moving distance to a predetermined position from the first object as a time for executing the function of the first object if the predetermined position ahead of the displayed second object is selected.

According to various embodiments of the present disclosure, the processor 410 may be configured to display a time corresponding to a moving distance during the movement from the first object toward the displayed second object.

According to various embodiments of the present disclosure, the processor 410 may be configured to display an execution screen of at least one application related to the first object while displaying the first object if the first object is selected by the second gesture, and to perform a function related to the at least one application for the item if the execution screen of the at least one application is selected by the third gesture continuing from the second gesture.

According to various embodiments of the present disclosure, the processor 410 may be configured to set a level corresponding to the second object as a level for the item, if the second object is selected by the third gesture continuing from the second gesture after selection of the first object.

According to various embodiments of the present disclosure, the processor 410 may be configured to move the item to a position corresponding to the second object, if the second object is selected by the third gesture continuing from the second gesture after selection of the first object.

According to various embodiments of the present disclosure, the processor 410 may be configured to display at least one sub menu if there is the at least one sub menu related to the second object if the second object is selected by the third gesture continuing from the second gesture after selection of the first object, and to move the item to a position corresponding to a sub menu selected from among the at least one sub menu by a fourth gesture continuing from the third gesture.

According to various embodiments of the present disclosure, the processor 410 may be configured to display the one or more first objects in positions that do not overlap with the item, and to display the one or more second objects in positions that do not overlap with the first object.

According to various embodiments of the present disclosure, the first gesture may correspond to a touch input and the second gesture, the third gesture, and the fourth gesture may correspond to a drag input.

Figure 10:
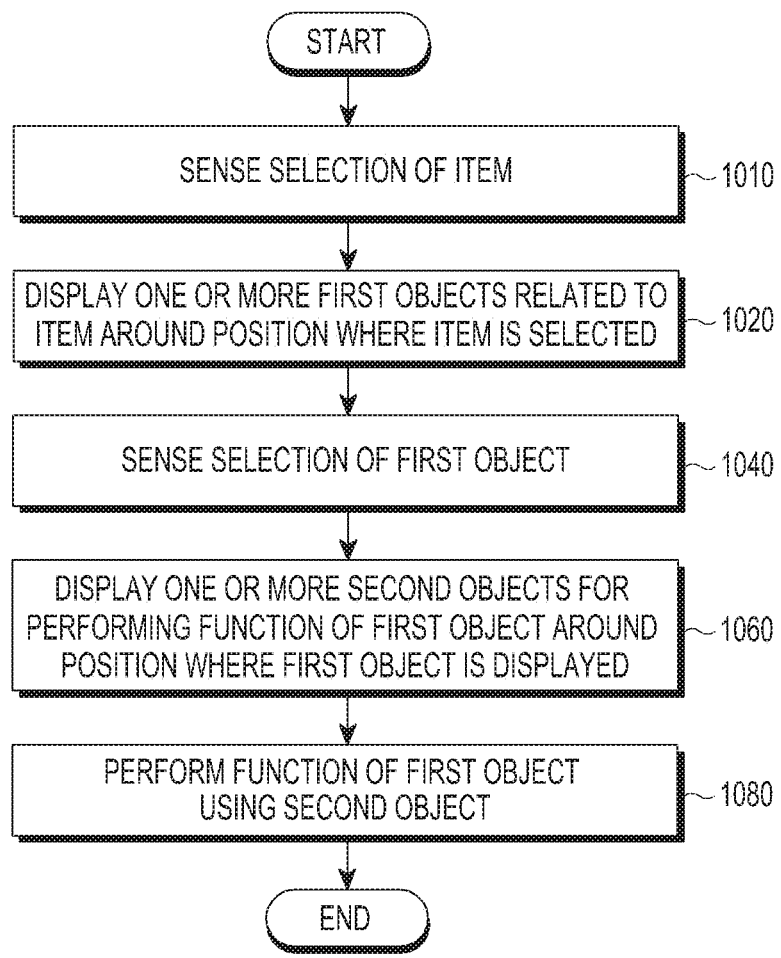
FIG. 10 is a flowchart of a method for displaying an object capable of controlling an item in an electronic device according to various embodiments of the present disclosure.

FIG. 10 is a flowchart of a method for displaying an object capable of controlling an item in an electronic device according to various embodiments of the present disclosure.

Referring to FIG. 10, a method for displaying an object capable of controlling an item according to various embodiments of the present disclosure may be performed, for example, by the processor 410 of the electronic device 401 shown in FIG. 4. Referring to FIG. 10, in operation 1010, the processor 410 determines whether an item is selected by a first gesture (e.g., a touch input) during displaying of an execution screen of an application. The application executed in operation 1010 may include at least one of an e-mail application, a message application, and an SNS application.

In operation 1020, the processor 410 displays one or more first objects related to the item around a position where the item is selected. The processor 410 determines a type of the one or more first objects according to a type of the application or a type of the item. In operation 1020, the processor 410 may determine a form for displaying the one or more first objects according to the position of the item. The processor 410 may display the one or more first objects in a form in which the one or more first objects are selectable while having at least one of distances and directions with respect to the position where the item is selected. For example, the one or more first objects may be displayed as a UI in a circular form around the position where the item is selected. The processor 410 may display the one or more first objects in a position where the one or more first objects do not overlap with the item.

Once sensing selection of a first object from among the one or more first objects by a second gesture (e.g., a drag input) in operation 1040, the processor 410 displays one or more second objects for performing a function of the selected first object around a position where the first object is selected in operation 1060.

If the first object is selected from among the one or more first objects by the second gesture (e.g., a drag input) continuing from the first gesture (e.g., a touch input) during selection of the item by the first gesture in operation 1040, the processor 410 may display the one or more second objects in operation 1060.

In operation 1080, if the second object is selected during sensing of movement toward the displayed second object by a third gesture (e.g., a drag input) continuing from the second gesture after selection of the first object, the processor 410 performs the function of the selected first object.

In operation 1080, the processor 410 may perform the function of the selected first object for the item by using the second object. In operation 1080, if the first object is selected from among the one or more first objects by the second gesture (e.g., a drag input) and then the second object is selected from among the one or more second objects by the third gesture (e.g., a drag input) continuing from the second gesture, then the processor 410 may perform the function of the selected first object.

In operation 1080, if a predetermined position ahead of the displayed second object is selected during sensing of movement toward the second object by the third gesture (e.g., a drag input) continuing from the second gesture after selection of the first object, the processor 410 may set a time corresponding to a moving distance from the first object to the predetermined position as a time for performing the function of the first object. The processor 410 displays a time corresponding to a moving distance during movement toward the displayed second object from the selected the first object.

In operation 1080, if the first object is selected, the processor 410 may display an execution screen of at least one application related to the first object while displaying the first object, and perform a function related to the at least one application for the item if the execution screen of the at least one application is selected by the third gesture (e.g., a drag input) continuing from the second gesture after selection of the first object.

In operation 1080, if the second object is selected by the third gesture (e.g., a drag input) continuing from the second gesture after selection of the first object, the processor 410 may set a level corresponding to the second object as a level for the item.

In operation 1080, if the second object is selected by the third gesture (e.g., a drag input) continuing from the second gesture after selection of the first object, the processor 410 may move the item to a position corresponding to the selected second object. When determining whether there is at least one sub object related to the selected second object, the processor 410 displays the at least one sub menu around a position where the second object is selected, and moves the item to a position corresponding to a sub menu selected from among the at least one sub menu by a fourth gesture (e.g., a drag input) continuing from the third gesture.

FIGS. 11A to 11D are flowcharts of a method for displaying an object capable of controlling an item in an electronic device according to various embodiments of the present disclosure. Although a method for displaying an object capable of controlling a mail item in an e-mail application will be described in various embodiments shown in FIGS. 11A to 11D, the method may also be equally applied to other applications such as a message application, an SNS application, a scheduler application, a diary application, and so forth. The method for displaying an object according to various embodiments of the present disclosure shown in FIGS. 11A to 11D may be performed by the processor 410 of the electronic device 401 shown in FIG. 4

Figure 11A:
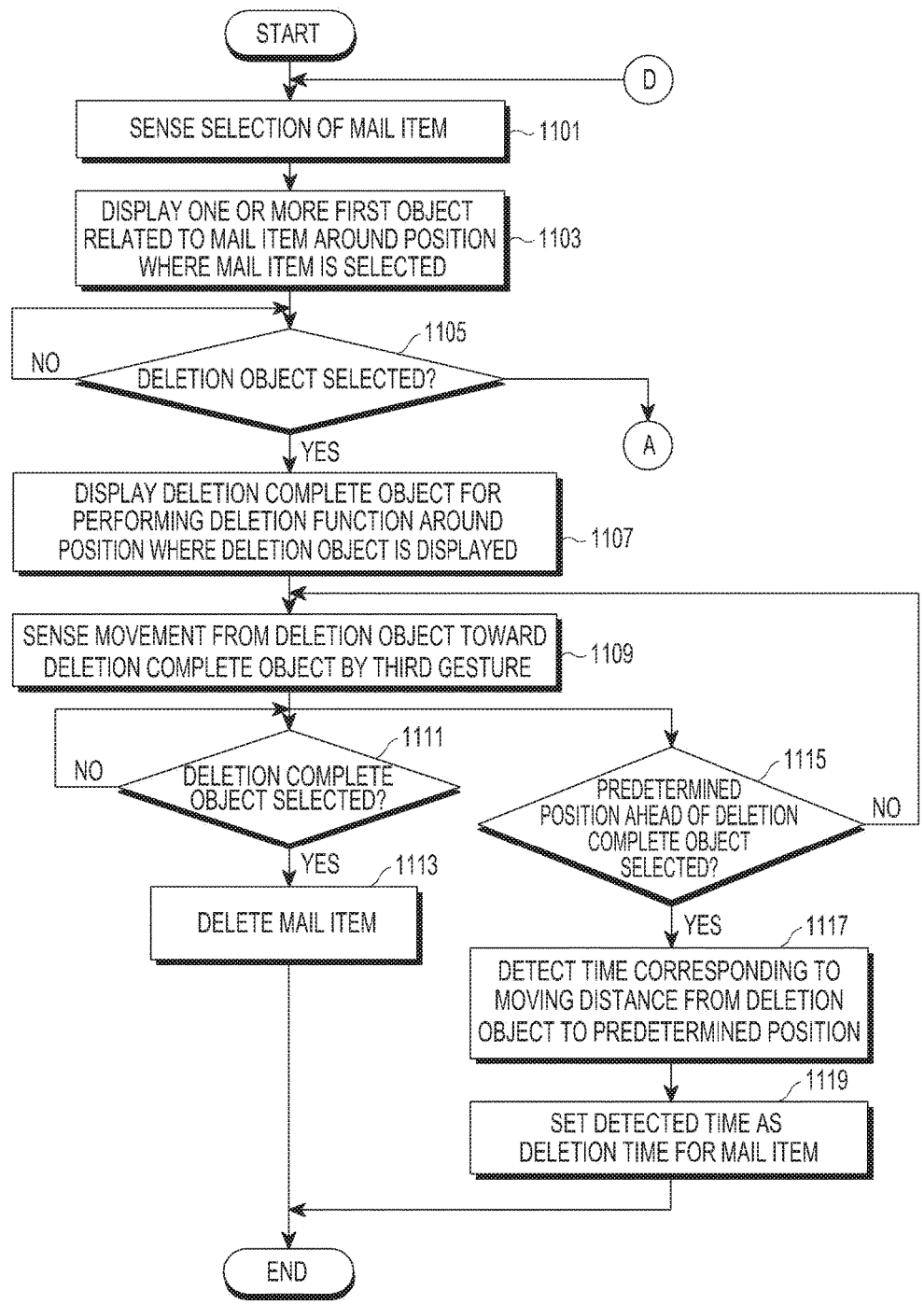
FIGS. 11A to 11D are flowcharts of a method for displaying an object capable of controlling an item in an electronic device according to various embodiments of the present disclosure.

Referring to FIG. 11A, if the e-mail application is executed and the first gesture (e.g., a touch input) is sensed on a mail item (e.g., a title of a mail) for a predetermined time or longer during displaying of a mail list or mail contents, then the processor 410 senses selection of the mail item (e.g., the title of the mail) in operation 1101. In operation 1103, the processor 410 detects one or more first objects related to the mail item and displays the one or more first objects around a position where the mail item is selected. For example, the processor 410 may display a UI in which the one or more first objects are arranged in a circular form around the position where the mail item is selected. In operation 1105, the processor 410 determines whether a deletion object capable of performing a deletion function is selected from among the one or more first objects by a second gesture (e.g., a drag input) continuing from a first gesture (e.g., a touch input) during selection of the mail item by the first gesture. If determining that the deletion object is selected in operation 1105, the processor 410 displays a deletion complete object in a position having a predetermined distance in a predetermined direction from a position where the deletion object is displayed in operation 1107.

If movement toward the displayed deletion complete object from the deletion object starts by a third gesture (e.g., a drag input) continuing from the second gesture after selection of the deletion object by the second gesture, the processor 410 displays a deletion time corresponding to a moving distance from the deletion object in operation 1109.

If determining that the deletion complete object is selected by the third gesture (e.g., a drag input) continuing from the second gesture after selection of the deletion object by the second gesture in operation 1111, the processor 410 deletes the mail item in operation 1113.

If determining that a predetermined position ahead of the delete completion object is selected by movement of the third gesture (e.g., a drag input) continuing from the second gesture after selection the deletion object by the second gesture in operation 1115, the processor 410 detects a time corresponding to a moving distance from the deletion object to the predetermined position in operation 1117. In operation 1119, the processor 410 sets the detected time as a deletion time for the mail item.

Figure 11B:
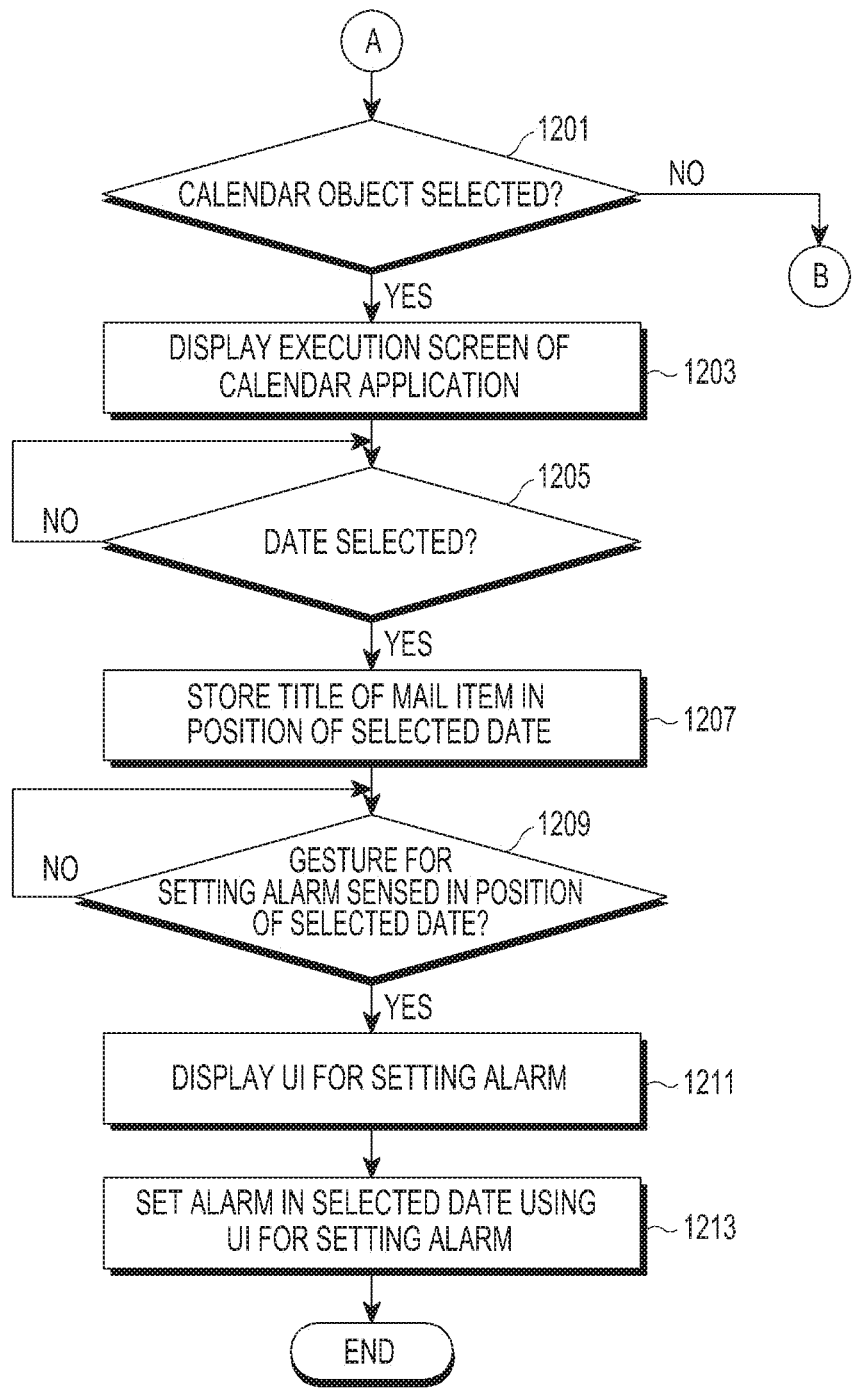

Referring to FIG. 11B, the processor 410 determines whether a calendar object capable of executing a calendar application is selected from among the one or more first objects by the second gesture (e.g., a drag input) continuing from the first gesture (e.g., a touch input) during selection of the mail item by the first gesture in operation 1201. In operation 1203, the processor 410 displays an execution screen of the calendar application in response to selection of the calendar object. In operation 1203, the processor 410 may display a calendar including a current date on the execution screen of the calendar application.

In operation 1205, the processor 410 determines whether a particular date is selected on the calendar displayed on the execution screen of the calendar application by a third gesture (e.g., a drag input) continuing from the second gesture after selection of the calendar object by the second gesture. If determining that the particular date is selected in operation 1205, the processor 410 stores a title of the mail item in a position of the particular date in operation 1207. If the title of the mail item stored in the position of the particular date is selected, the processor 410 may display mail contents corresponding to the selected mail item.

If sensing a fifth gesture (e.g., two consecutive touch inputs within a predetermined time) for setting an alarm in the position of the particular date in operation 1209, then the processor 410 displays a UI (e.g., a clock UI) for setting an alarm in operation 1211. In operation 1213, if an alarm time is selected using the UI for alarm setting, the processor 410 sets the selected alarm time as an alarm time for the mail item stored in the position of the particular date.

Figure 11C:
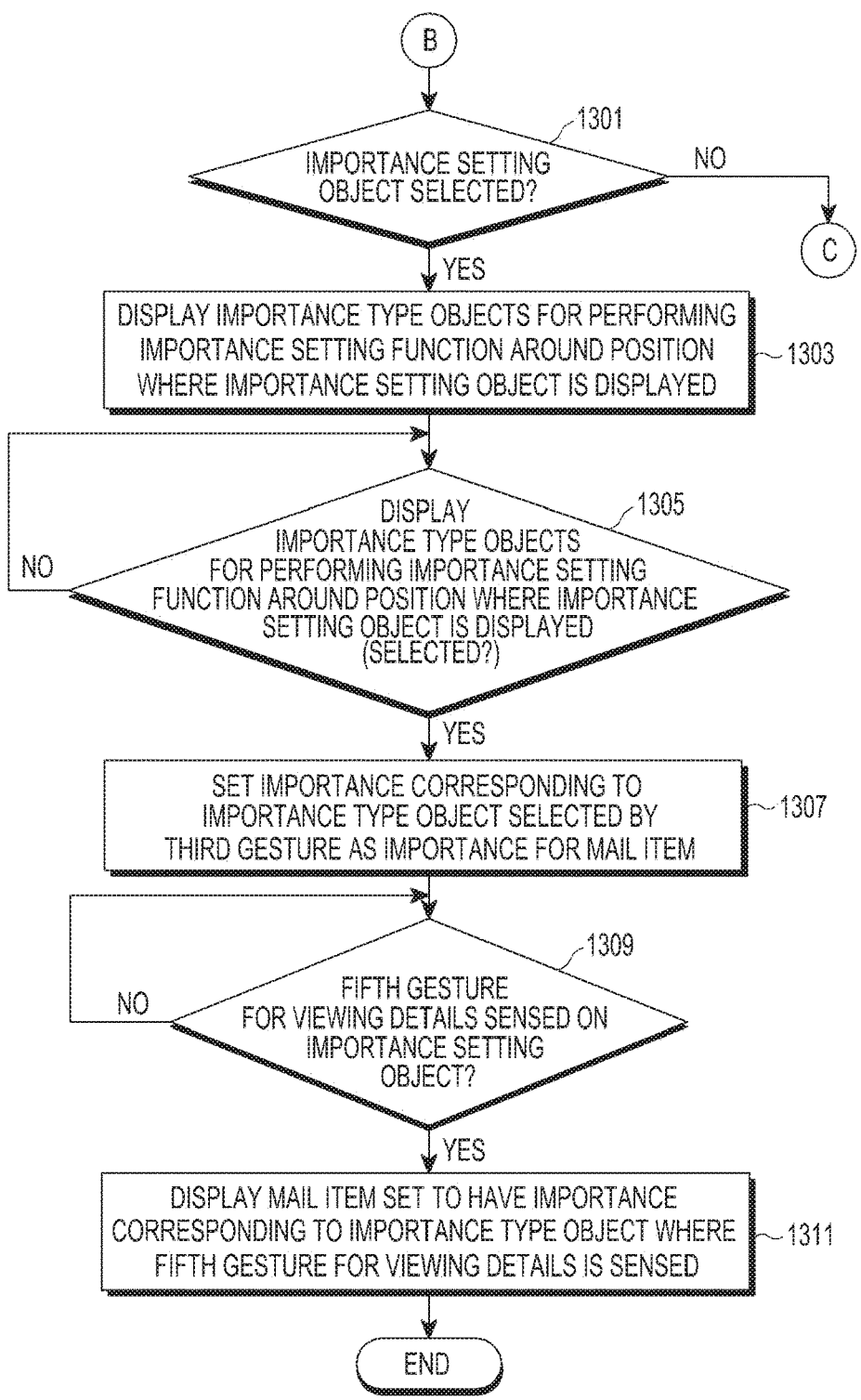

Referring to FIG. 11C, in operation 1301, the processor 410 determines whether an importance setting object for setting importance is selected from among the one or more first objects by the second gesture (e.g., a drag input) continuing from the first gesture (e.g., a touch input) during selection of the mail item by the first gesture. If determining that the importance setting object is selected in operation 1301, the processor 410 displays importance type objects around a position where the importance setting object is selected in operation 1303.

In operation 1305, the processor 410 determines whether an importance type object is selected by the third gesture (e.g., a drag input) continuing from the second gesture after selection of the importance setting object by the second gesture. If determining that the importance type object is selected in operation 1305, the processor 410 sets an importance corresponding to the selected importance type object as an importance for the mail item in operation 1307.

In operation 1309, the processor 410 determines whether the fifth gesture (e.g., two consecutive touch inputs within a predetermined time) for viewing details is sensed on the selected importance type object after the importance type object is selected by the third gesture (e.g., a drag input) continuing from the second gesture after selection of the importance setting object by the second gesture. If determining that the fifth gesture is sensed on the selected importance type object in operation 1309, the processor 410 displays one or more mail items set to have the importance corresponding to the selected importance type object in operation 1311.

Figure 11D:
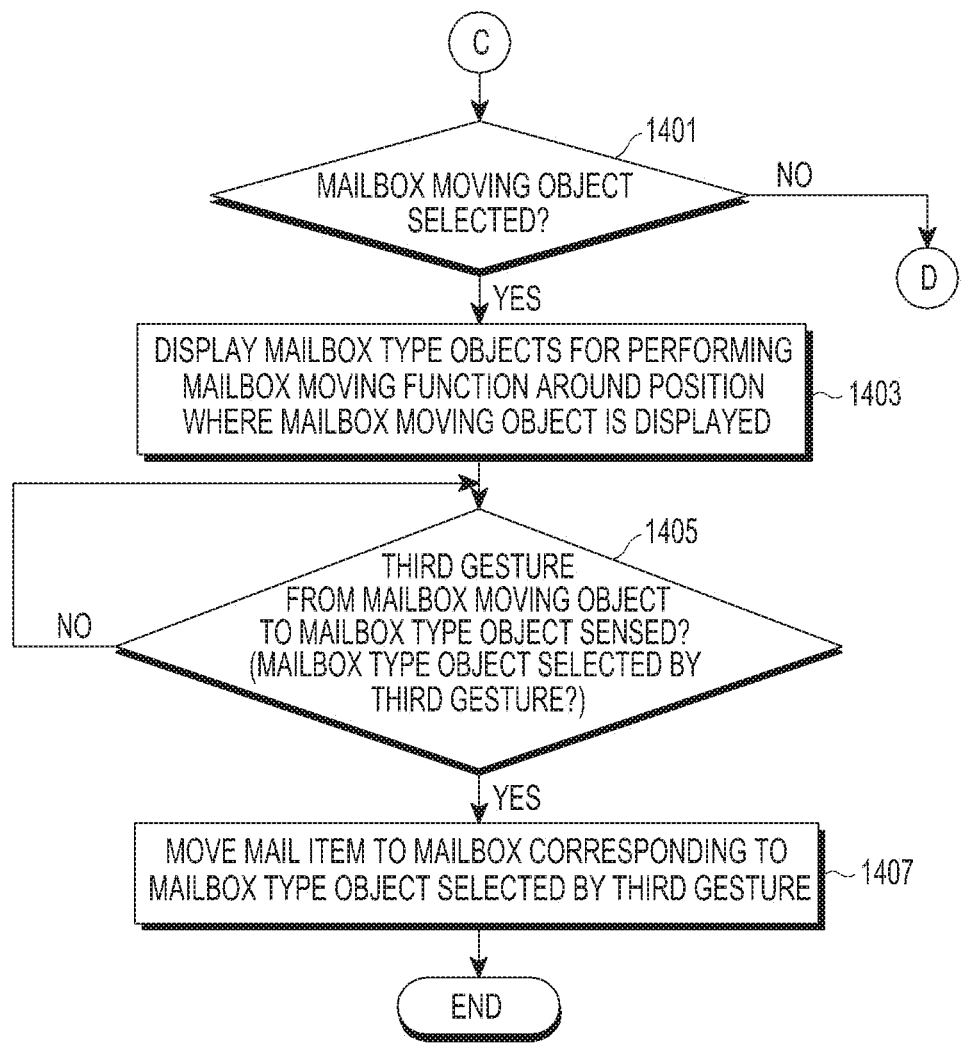

Referring to FIG. 11D, in operation 1401, the processor 410 determines whether a mailbox moving object for moving a mail item is selected from among the one or more first objects by the second gesture (e.g., a drag input) continuing from the first gesture (e.g., a touch input) during selection of the mail item by the first gesture. If determining that the mailbox moving object is selected by the second gesture (e.g., a drag input) in operation 1401, the processor 410 displays mailbox type objects around a position where the mailbox moving object is selected in operation 1403. For example, if the mail box is positioned in an upper portion of the screen, the mailbox type objects may be displayed under the mail box.

In operation 1405, the processor 410 determines whether a mailbox type object is selected by the third gesture (e.g., a drag input) continuing from the second gesture after selection of the mailbox moving object by the second gesture. If determining that the mailbox type object is selected by the third gesture (e.g., a drag input) in operation 1405, the processor 410 moves the mail item to a mailbox corresponding to the selected mailbox type object in operation 1407. In operation 1407, if there is at least one sub object for the selected mailbox type object, the processor 410 may move the mail item to a mail box corresponding to a sub object selected from among the at least one sub object by a fourth gesture (e.g., a drag input) continuing from the third gesture.

According to various embodiments of the present disclosure, a method for displaying an object in an electronic device may include displaying one or more first objects related to a selected item if the item is selected by a first gesture from among one or more items displayed on a display and displaying one or more second objects for performing a function of a selected first object if the first object is selected by a second gesture continuing from the first gesture from among the one or more first objects.

According to various embodiments of the present disclosure, the one or more first objects may be displayed to be selected while having at least one of a distance, a direction, and a speed with respect to a position of the item, and the one or more first objects may be displayed spaced apart from each other.

According to various embodiments of the present disclosure, the method may further include sensing movement toward the displayed second object by a third gesture continuing from the second gesture after selection of the first object, performing the function of the selected first object if the second object is selected during the movement toward the displayed second object by the third gesture, and setting a time corresponding to a moving distance to a predetermined position from the first object as a time for executing the function of the first object if the predetermined position ahead of the displayed second object is selected during the movement toward the displayed second object by the third gesture.

According to various embodiments of the present disclosure, the method may further include displaying a time corresponding to a moving distance during the movement from the first object toward the displayed second object.

According to various embodiments of the present disclosure, the method may further include displaying an execution screen of at least one application related to the first object while displaying the first object if the first object is selected by the second gesture and performing a function related to the at least one application for the item if the execution screen of the at least one application is selected by the third gesture continuing from the second gesture.

According to various embodiments of the present disclosure, the method may further include setting a level corresponding to the second object as a level for the item, if the second object is selected by the third gesture continuing from the second gesture after selection of the first object.

According to various embodiments of the present disclosure, the method may further include moving the item to a position corresponding to the second object, if the second object is selected by the third gesture continuing from the second gesture after selection of the first object.

According to various embodiments of the present disclosure, the method may further include determining whether there is at least one sub menu related to the second object if the second object is selected by the third gesture continuing from the second gesture after selection of the first object, displaying the at least one sub menu if determining that there is the at least one sub menu related to the second object, and moving the item to a position corresponding to a sub menu selected from among the at least one sub menu by a fourth gesture continuing from the third gesture.

According to various embodiments of the present disclosure, the method may further include displaying the one or more first objects in positions that do not overlap with the item and displaying the one or more second objects in positions that do not overlap with the first object.

According to various embodiments of the present disclosure, the first gesture may correspond to a touch input and the second gesture, the third gesture, and the fourth gesture may correspond to a drag input.

As is apparent from the foregoing description, the electronic device and the method for displaying an object in the electronic device according to various embodiments of the present disclosure intuitively provide various functions capable of controlling information of an application through a UI in a particular form, allowing simple and convenient control over the information of the application.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a display; and
    at least one processor configured to:
        control to display on the display one or more first objects related to a selected item if the item is selected by a first gesture from among one or more items displayed on the display,
        control to display on the display one or more second objects for performing a function of a selected first object if the first object is selected by a second gesture from among the one or more first objects,
        if a predetermined position ahead of the displayed one or more second objects is selected during movement toward one of the one or more second objects by a third gesture after selection of the first object, set a time corresponding to a distance through which the third gesture moves toward the second object to a predetermined position from the first object as a time for executing the function of the first object, and
        perform the function of the selected first object at the set time.

2. The electronic device of claim 1,
    wherein the one or more first objects are displayed to be selected while having at least one of a distance, a direction, or a speed with respect to a position of the item, and
    wherein the one or more first objects are displayed spaced apart from each other.

3. The electronic device of claim 1, wherein the at least one processor is further configured to control to display on the display a time corresponding to a moving distance during the movement from the first object toward the second object.

4. The electronic device of claim 1, wherein the at least one processor is further configured to:
    control to display on the display an execution screen of at least one application related to the first object while displaying the first object if the first object is selected by the second gesture, and
    perform a function related to the at least one application for the item if the execution screen of the at least one application is selected by a third gesture continuing from the second gesture.

5. The electronic device of claim 1, wherein the at least one processor is further configured to set a level corresponding to a second object as a level for the item, if the second object is selected by a third gesture continuing from the second gesture after selection of the first object.

6. The electronic device of claim 1, wherein the at least one processor is further configured to move the item to a position corresponding to a second object, if the second object is selected by a third gesture continuing from the second gesture after selection of the first object.

7. The electronic device of claim 1, wherein the at least one processor is further configured to:
    control to display on the display at least one sub menu if there is the at least one sub menu related to the second object if the second object is selected by a third gesture continuing from the second gesture after selection of the first object, and
    move the item to a position corresponding to a sub menu selected from among the at least one sub menu by a fourth gesture continuing from the third gesture.

8. The electronic device of claim 1, wherein the at least one processor is further configured to:
    control to display on the display the one or more first objects in positions that do not overlap with the item, and
    display the one or more second objects in positions that do not overlap with the first object.

9. The electronic device of claim 1,
    wherein the first gesture corresponds to a touch input, and
    wherein the second gesture, a third gesture, and a fourth gesture correspond to a drag input.

10. A method for displaying an object in an electronic device, the method comprising:
    displaying one or more first objects related to a selected item in response to the item being selected by a first gesture from among one or more items displayed on a display;
    displaying one or more second objects for performing a function of a selected first object in response to the first object being selected by a second gesture from among the one or more first objects,
    if a predetermined position ahead of the displayed one or more second objects is selected during movement toward one of the one or more second objects by a third gesture after selection of the first object, setting a time corresponding to a distance through which the third gesture moves toward the second object to a predetermined position from the first object as a time for executing the function of the first object; and
    performing the function of the selected first object at the set time.

11. The method of claim 10,
    wherein the one or more first objects are displayed to be selected while having at least one of a distance, a direction, or a speed with respect to a position of the item, and
    wherein the one or more first objects are displayed spaced apart from each other.

12. The method of claim 10, further comprising:
    displaying a time corresponding to a moving distance during the movement from the first object toward the second object.

13. The method of claim 10, further comprising:
    displaying an execution screen of at least one application related to the first object while displaying the first object if the first object is selected by the second gesture; and performing a function related to the at least one application for the item if the execution screen of the at least one application is selected by a third gesture continuing from the second gesture.

14. The method of claim 10, further comprising:
setting a level corresponding to a second object as a level for the item, if the second object is selected by a third gesture continuing from the second gesture after selection of the first object.

15. The method of claim 10, further comprising:
moving the item to a position corresponding to a second object, if the second object is selected by a third gesture continuing from the second gesture after selection of the first object.

16. The method of claim 10, further comprising:
determining whether there is at least one sub menu related to the second object if the second object is selected by a third gesture continuing from the second gesture after selection of the first object;
displaying the at least one sub menu if determining that there is the at least one sub menu related to the second object; and
moving the item to a position corresponding to a sub menu selected from among the at least one sub menu by a fourth gesture continuing from the third gesture.

17. The method of claim 10, further comprising:
displaying the one or more first objects in positions that do not overlap with the item; and
displaying the one or more second objects in positions that do not overlap with the first object.

18. The method of claim 10,
wherein the first gesture corresponds to a touch input, and
wherein the second gesture, a third gesture, and a fourth gesture correspond to a drag input.

* * * * *